US012730403B2

(12) United States Patent
Miyahara

(10) Patent No.: US 12,730,403 B2
(45) Date of Patent: Sep. 8, 2026

(54) APPARATUS THAT OBTAINS CONDITION INFORMATION OF PART OF PRINTING APPARATUS, METHOD, SYSTEM, AND STORAGE MEDIUM

(71) Applicant: CANON KABUSHIKI KAISHA, Tokyo (JP)

(72) Inventor: Nobuaki Miyahara, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/485,635

(22) Filed: Oct. 12, 2023

(65) Prior Publication Data

US 2024/0126201 A1 Apr. 18, 2024

(30) Foreign Application Priority Data

Oct. 17, 2022 (JP) ................................ 2022-166417

(51) Int. Cl.
*G03G 15/00* (2006.01)

(52) U.S. Cl.
CPC ......... *G03G 15/55* (2013.01); *G03G 15/5062* (2013.01); *G03G 15/553* (2013.01); *G03G 2215/00067* (2013.01); *G03G 2221/1663* (2013.01)

(58) Field of Classification Search
CPC .. G03G 15/55; G03G 15/5062; G03G 15/553; G03G 2215/00067; G03G 2221/00059; G03G 2221/1663; G03G 2221/1666; G03G 2215/00708
See application file for complete search history.

(56) References Cited

U.S. PATENT DOCUMENTS 5,365,310 A * 11/1994 Jenkins .................... H04N 1/32 399/8
5,717,974 A * 2/1998 Park ..................... G03G 15/553 399/24
10,498,929 B2 12/2019 Tomii
2003/0133721 A1* 7/2003 Brewington ....... H04N 1/00029 399/19
2009/0297174 A1* 12/2009 Soures .................. G03G 15/55 399/18
2019/0227475 A1* 7/2019 Tachibana .......... G03G 15/0863

FOREIGN PATENT DOCUMENTS

JP 2019092034 A 6/2019

* cited by examiner

*Primary Examiner* — Stephanie E Bloss
*Assistant Examiner* — Laura Roth
(74) *Attorney, Agent, or Firm* — ROSSI, KIMMS & McDOWELL LLP

(57) ABSTRACT

An object is to enable management work such as maintenance of parts of a printing apparatus in an integrated manner. An apparatus according to the present disclosure obtains: first condition information indicating a condition of a constituent part of a printing apparatus, specified based on a life of the part; and second condition information indicating a condition of the part specified based on a scanned image obtained by reading a print medium on which an image has been formed by the printing apparatus. The apparatus further generates a display image representing the condition of the part indicated by the first condition information and the condition of the part indicated by the second condition information, and outputs a signal representing the display image.

17 Claims, 16 Drawing Sheets

APPARATUS THAT OBTAINS CONDITION INFORMATION OF PART OF PRINTING APPARATUS, METHOD, SYSTEM, AND STORAGE MEDIUM

BACKGROUND

Field

The present disclosure relates to a user interface technology.

Description of the Related Art

A technique has been known in which a user of a printing apparatus, such as a multifunction peripheral (MFP), is notified of timing to replace or clean a constituent part of the printing apparatus for proper maintenance of the printing apparatus. Specifically, there has been a technique in which a user is notified of the ratio of the number of uses of a part at present to a predetermined lifetime number of uses of the part, the ratio of the number of uses of the part at present to a predetermined number of uses until the part needs cleaning, or the like. By checking this notification, the user can predict when the part needs work such as replacement or cleaning before an image forming problem occurs. Japanese Patent Laid-Open No. 2019-92034 discloses a technique in which the cause of a problem in a printing apparatus is specified based on an image obtained by optically reading an image formed on a print medium by the printing apparatus (hereinafter referred to as "scanned image") and a user is notified of the cause. By checking this notification, the user can address the problem in the printing apparatus.

Japanese Patent Laid-open No. 2019-92034 discloses notification based on a scanned image but does not disclose or suggest notification based on the life of a part such as the number of uses or period of use of the part. In a case where the notification based on a part's life and the notification based on a scanned image are implemented with different user interfaces, application programs, or the like, there is a problem that management work such as maintenance of the part in the printing apparatus is complicated.

SUMMARY

An apparatus of the present disclosure comprising: one or more hardware processors; and one or more memories storing one or more programs configured to be executed by the one or more hardware processors, the one or more programs including instructions for: obtaining first condition information indicating a condition of a constituent part of a printing apparatus, specified based on a life of the part; obtaining second condition information indicating a condition of the part specified based on a scanned image obtained by reading a print medium on which an image has been formed by the printing apparatus; generating a display image representing the condition of the part indicated by the first condition information and the condition of the part indicated by the second condition information; and outputting a signal representing the display image.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

Embodiment 1

Figure 1:
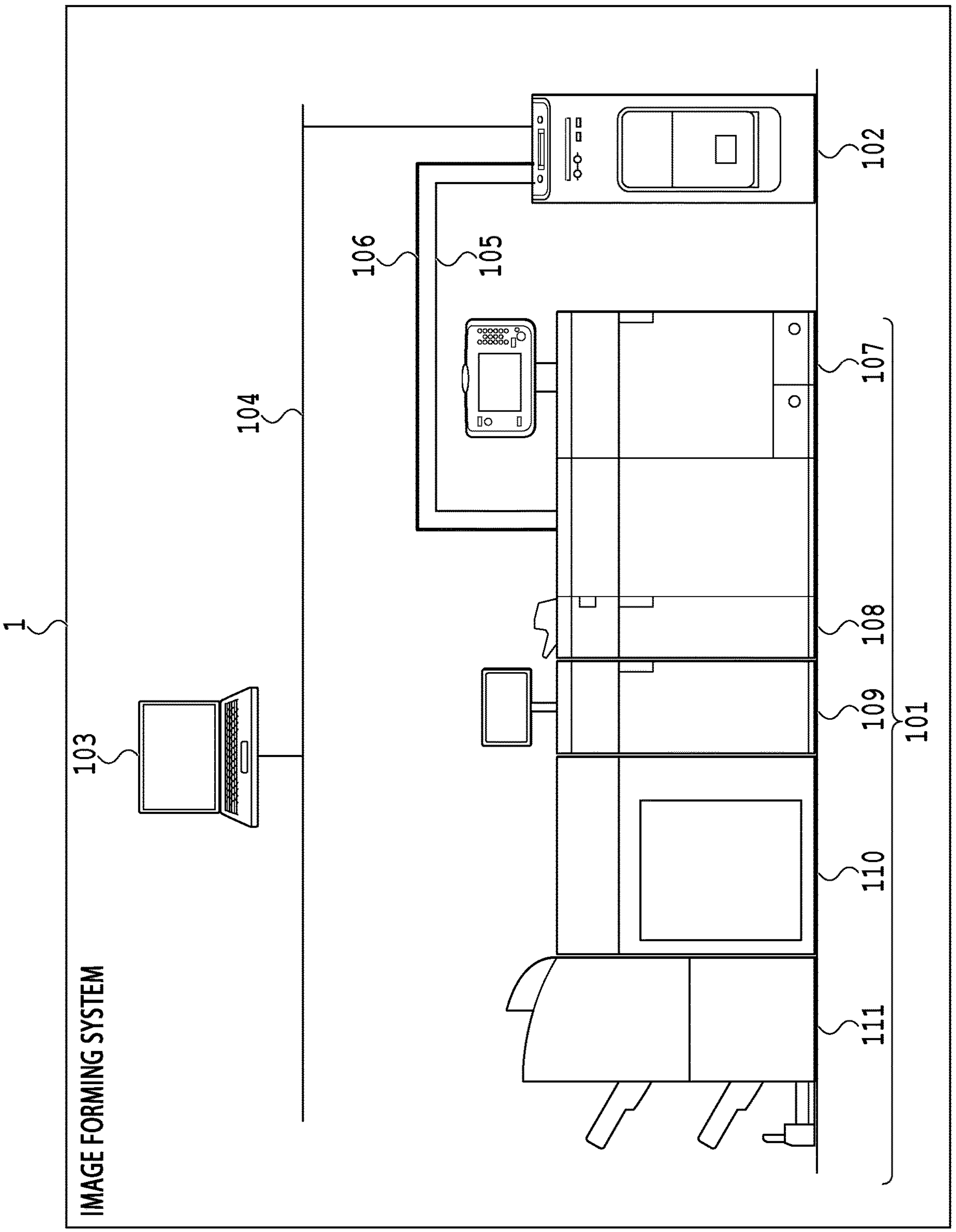
FIG. 1 is a diagram illustrating an example of an apparatus configuration of an image forming system.

FIG. 1 is a diagram illustrating an example of an apparatus configuration of an image forming system 1 according to Embodiment 1. The image forming system 1 includes an image forming apparatus 101, an external controller 102, and a user terminal 103 that operates as an information processing apparatus. Here, the image forming apparatus 101 is an MFP or the like and has a function of forming an image on a print medium, such as paper, and a function of obtaining data of a scanned image by reading the image formed on the print medium. The external controller 102 is also called an image processing controller, a digital front end (DFE), a print server, or the like. The image forming apparatus 101 and the external controller 102 are communicatively connected to each other through a first communication line 105, such as a wired local area network (LAN) or a wireless LAN, and a video cable 106. Also, the external controller 102 and the user terminal 103 are communicatively connected to each other through a second communication line 104, such as a wired LAN or a wireless LAN, and the user terminal 103 issues a print instruction to the external controller 102.

In the user terminal 103 is installed a printer driver having a function of generating print data by converting data into a print description language processable by the external controller 102. In a case of printing desired data, a user using the image forming apparatus 101 (hereinafter referred to as "operator") can issue a print instruction via the printer driver from various applications run on the user terminal 103. The printer driver generates print data corresponding to the data based on the print instruction from the operator, and sends the print data to the external controller 102. In response to receiving the print instruction from the user terminal 103, the external controller 102 performs a data analysis process and a rasterization process on the received print data, and sends the rasterized print data to the image forming apparatus 101 and issues a print instruction to it. Specifically, the external controller 102, for example, sends the image data obtained by the rasterization process to the image forming apparatus 101 through the video cable 106, and sends a print job for printing this image data to the image forming apparatus 101 through the first communication line 105.

The image forming apparatus 101 includes multiple apparatuses equipped with different functions, and is configured to be capable of performing complicated print processes, such as bookbinding. For example, the image forming apparatus 101 includes a printing apparatus 107, an inserter 108, an inspection apparatus 109, a large-capacity stacker 110, and a finisher 111. The printing apparatus 107 forms an image using toners on a print medium conveyed from a sheet feed unit disposed at a lower portion or the like of the printing apparatus 107.

Specifically, the printing apparatus 107 irradiates a photosensitive drum with a reflected light beam, as a scanning beam, which is a light beam, such as a laser beam, modulated based on the image data and reflected by a polygon mirror, such as a rotary polygon mirror. The electrostatic-latent image formed on the photosensitive drum by the scanning beam is developed with a toner, and the toner image obtained by the development is transferred onto a print medium attached to a transfer drum. This series of image forming processes is executed sequentially for multiple toners, such as yellow (Y), magenta (M), cyan (C), and black (K) toners, to form a full-color image on the print medium. The print medium on the transfer drum to which images have been formed is conveyed to a fixing device. The fixing device includes a roller, a belt, and so on, with a heat source, such as a halogen heater, incorporated in the roller. The fixing device fuses the toners on the print medium to which the toner images have been transferred by heating and pressing the toners with the roller to thereby fix the toners to the print medium.

The inserter 108 is an apparatus for inserting insertion sheets. Specifically, the inserter 108 inserts insertion sheets at any positions in and on a group of print media on which images have been formed by the printing apparatus 107 and which have been conveyed to the inserter 108. Print media after the image forming by the printing apparatus 107 are conveyed to the inspection apparatus 109 through the inserter 108. The inspection apparatus 109 reads each print medium conveyed from the printing apparatus 107 and obtains data of the image obtained by this reading (hereinafter referred to as "scanned image"). For example, the inspection apparatus 109 compares the data of the scanned image and data of a pre-registered image serving as a reference (hereinafter referred to as "reference image") with each other. The inspection apparatus 109 uses this comparison to detect problems such as abnormalities in the image formed on the print medium (hereinafter referred to as "formed image").

In a case of detecting a problem in the formed image, the inspection apparatus 109 specifies the form of the problem and specifies the cause of the problem in the image forming in the printing apparatus 107 based on the specified form of the problem. Hereinafter, a series of processes by the inspection apparatus 109 to specify the cause of a problem in the image forming in the printing apparatus 107 will be described as "image examination process". The present embodiment will be exemplarily described on the assumption that the inspection apparatus 109 performs the image examination process based on a scanned image obtained by reading a print medium on which an image has been formed using a dedicated chart. The approach using the dedicated chart is a mere example, and the inspection apparatus 109 may perform the image examination process based on a scanned image obtained by reading a print medium on which an image has been formed using ordinary data.

The large-capacity stacker 110 is an apparatus that can be loaded with a large number of print media after image forming conveyed thereto. The finisher 111 is an apparatus that performs a finishing process on a print medium after image forming conveyed thereto. The finisher 111 performs the finishing process, such as stapling, punching, or saddle stitching, based on a setting. The print medium conveyed to the finisher 111 or the print medium after the finishing process by the finisher 111 is discharged onto a sheet discharge tray.

The image forming system 1 illustrated in FIG. 1 is configured such that the image forming apparatus 101 and the external controller 102 are connected through the first communication line 105 and the video cable 106, but the connection between the image forming apparatus 101 and the external controller 102 is not limited to the above configuration. For example, the configuration may be such that the functions of the external controller 102 are included in the image forming apparatus 101, and the image forming apparatus 101 is connected to the second communication line 104 so that the image forming apparatus 101 receives print data from the user terminal 103 through the second communication line 104. In this case, the image forming apparatus 101 performs the data analysis process and the rasterization process and forms an image on a print medium by using the image data obtained by this rasterization process.

Figure 2:
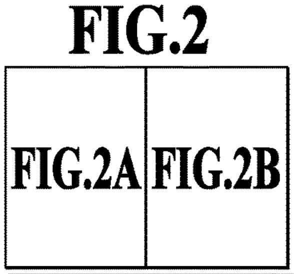
FIG. 2 is a diagram showing a relationship between FIGS. 2A and 2B.
Figure 2A:
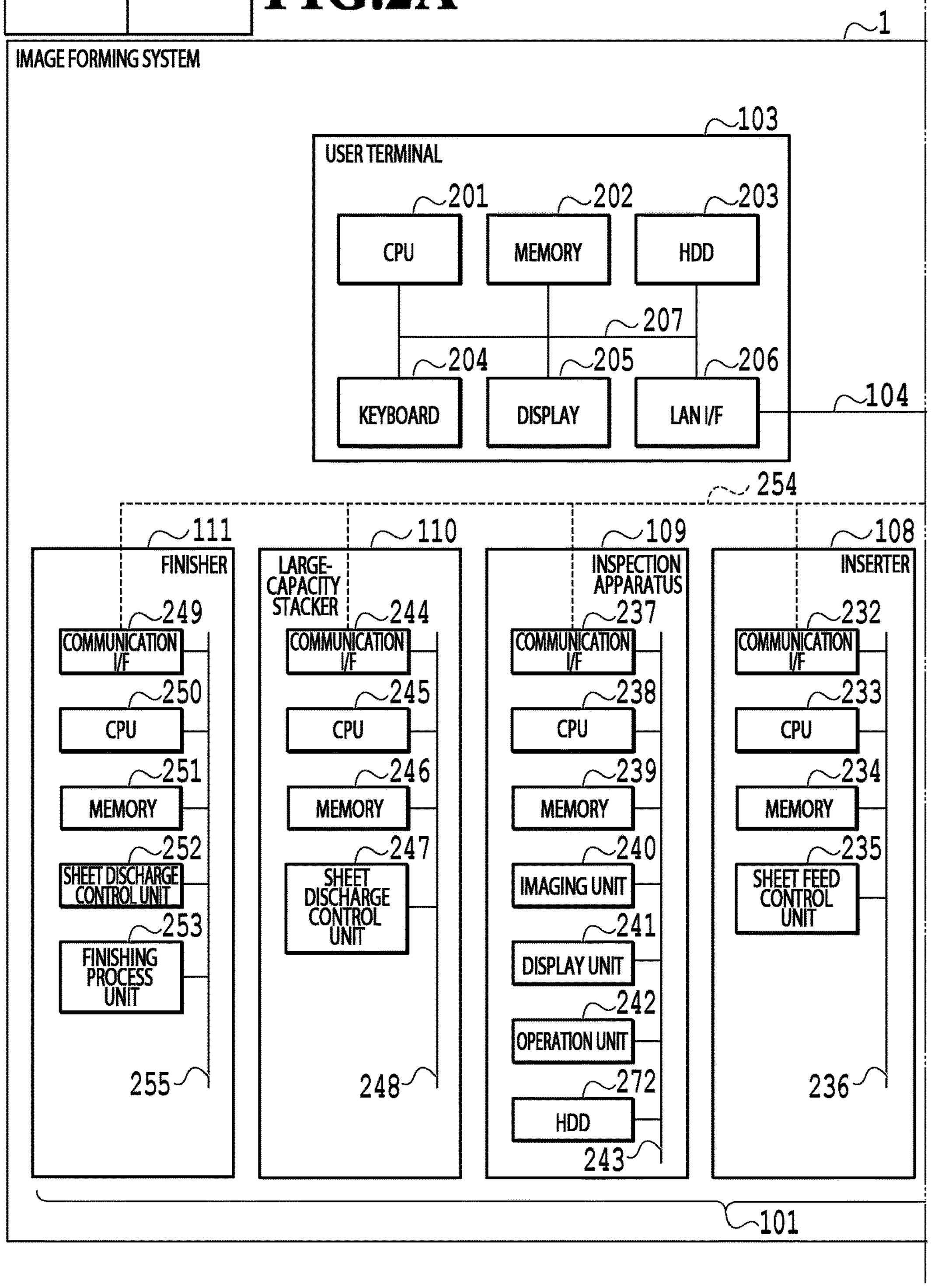
FIGS. 2A and 2B are block diagrams illustrating an example of hardware configurations of an image forming apparatus, an external controller, and a user terminal.
Figure 2B:
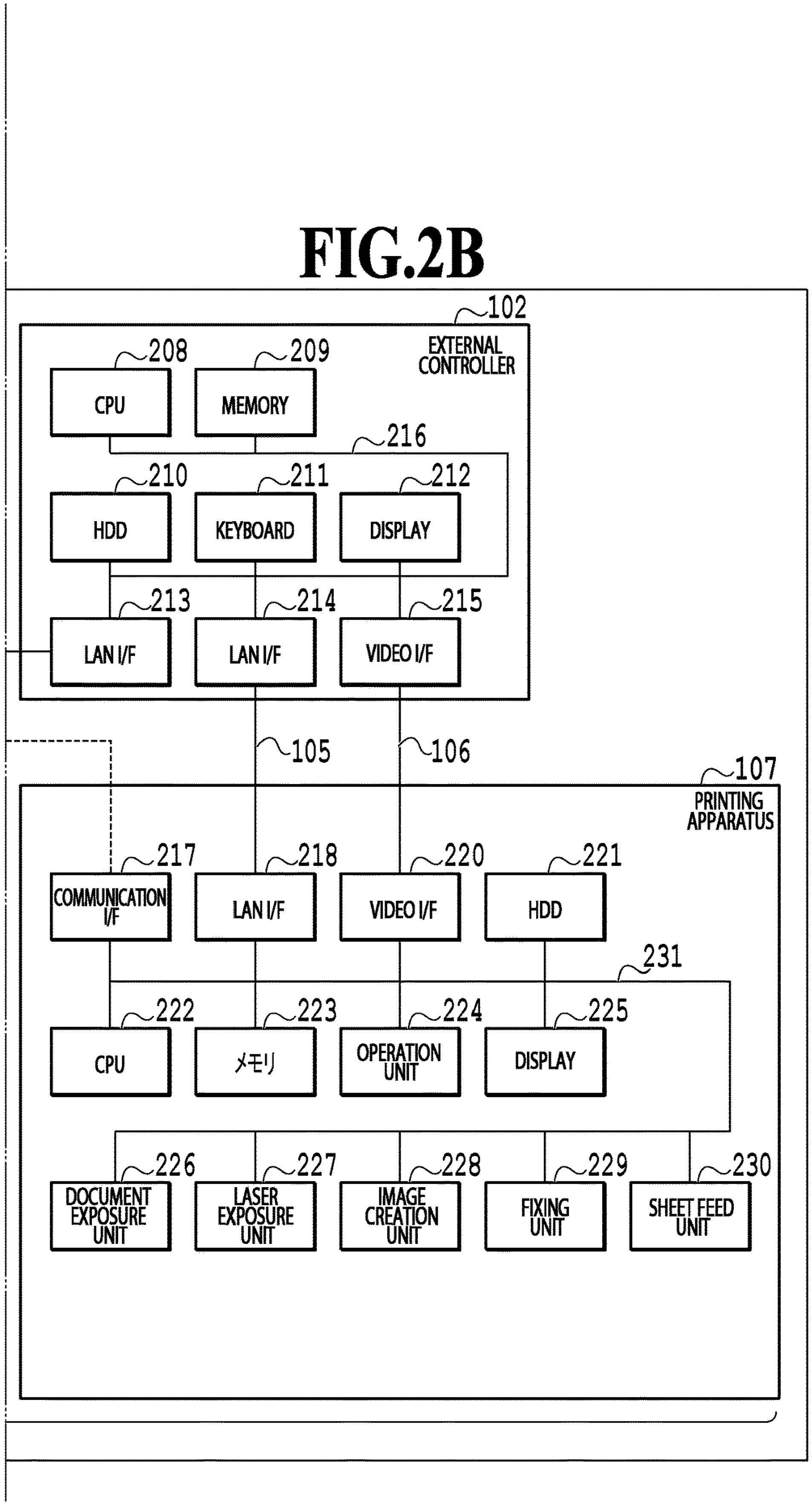

FIG. 2 is a block diagram illustrating an example of a hardware configuration of each of the image forming apparatus 101, the external controller 102, and the user terminal 103 according to Embodiment 1. First, a hardware configuration of the printing apparatus 107 of the image forming apparatus 101 will be described. The printing apparatus 107 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 further includes a document exposure unit 226, a laser exposure unit 227, an image creation unit 228, a fixing unit 229, and a sheet feed unit 230. The above pieces of hardware included in the printing apparatus 107 are communicatively connected to one another through a system bus 231.

The communication I/F 217 is connected to the inserter 108, the inspection apparatus 109, the large-capacity stacker 110, and the finisher 111 through a communication cable 254. Signals for controlling these apparatuses are sent and received through the communication I/F 217. The LAN I/F 218 is connected to the external controller 102 through the first communication line 105. Data such as print jobs transmitted by the external controller 102 are sent and received through the LAN I/F 218. The video I/F 220 is connected to the external controller 102 through the video cable 106. Data such as image data obtained by the rasterization process are sent and received through the video OF 220. The HDD 221 is a non-volatile auxiliary storage apparatus storing programs and data. The CPU 222 comprehensively controls image processing, an image forming process, and the like based on the programs stored in the HDD 221. The memory 223 is a volatile storage apparatus storing programs and image data which the CPU 222 needs to perform various processes, and is used as a work area for the CPU 222.

The operation unit 224 accepts operations such as inputs of various settings and inputs of various instructions from the operator. The display 225 displays information on various settings of the image forming apparatus 101, the processing statuses of print jobs, and the like. The document exposure unit 226 reads the document (print medium) in a case of using a copying function or a scanning function. The document exposure unit 226 images the document placed by the operator with an image sensor, such as a charge coupled device (CCD) while illuminating the document with an exposure lamp to thereby read the image formed on the document and generates data of the image. The laser exposure unit 227 performs primary charging for irradiating the photosensitive drum with a laser beam and exposure with the laser beam. Specifically, the laser exposure unit 227 firstly performs primary charging which charges the surface of the photosensitive drum to a uniform negative potential. Then, the laser exposure unit 227 irradiates the photosensitive drum with a reflected light beam of a laser beam emitted by a laser driver while the reflection angle is adjusted with a polygon mirror. This neutralizes the negative potential at the portions of the photosensitive drum irradiated with the laser beam, so that an electrostatic-latent image is formed on the photosensitive drum.

The image creation unit 228 includes a development unit, transfer unit, a toner supply unit, and so on, and transfers toners on the photosensitive drum to a print medium. Specifically, at the development unit, the image creation unit 228 attaches negatively charged toners from development cylinders to the electrostatic-latent image on the surface of the photosensitive drum to make it into a visible image. Moreover, at the transfer unit, the image creation unit 228 performs primary transfer that transfers the toners on the surface of the photosensitive drum to a transfer belt by applying a positive potential to a roller for the primary transfer, and then performs secondary transfer that transfers the toners on the transfer belt to a print medium by applying a positive potential to an outer roller for the secondary transfer. The fixing unit 229 includes a heater, a fixing belt, a pressure belt, and so on and fuses and fixedly attaches the toners on the print medium to the print medium by heating and pressing the toners on the print medium. The sheet feed unit 230 feeds print media. Specifically, the sheet feed unit 230 controls the feed and conveyance of print media by controlling rollers and various sensors.

Next, a hardware configuration of the inserter 108 of the image forming apparatus 101 will be described. The inserter 108 includes a communication I/F 232, a CPU 233, a memory 234, and a sheet feed control unit 235. The above pieces of hardware included in the inserter 108 are communicatively connected to one another through a system bus 236. The communication I/F 232 is connected to the printing apparatus 107 through the communication cable 254, and receives signals for controlling the inserter 108 through the communication cable 254. The CPU 233 performs various kinds of control necessary for a process of feeding an insertion sheet and the like in accordance with a control program stored in the memory 234. The memory 234 is a storage apparatus storing the control program and the like, and operates as a work area for the CPU 233. The sheet feed control unit 235 controls the feed and conveyance of insertion sheets conveyed from the sheet feed unit of the inserter 108 and print media conveyed from the printing apparatus 107 by controlling rollers and sensors based on instruction signals output from the CPU 222.

Next, a hardware configuration of the inspection apparatus 109 of the image forming apparatus 101 will be described. The inspection apparatus 109 includes a communication I/F 237, CPU 238, a memory 239, an imaging unit 240, a display unit 241, an operation unit 242, and an HDD 272. The above pieces of hardware included in the inspection apparatus 109 are communicatively connected to one another through a system bus 243. The communication I/F 237 is connected to the printing apparatus 107 through the communication cable 254, and receives signals for controlling the inspection apparatus 109 through the communication cable 254. The inspection apparatus 109 also receives the data of the reference image to be used in the image examination process from the printing apparatus 107 through the communication cable 254 and the communication I/F 237 and stores it in the HDD 272. The CPU 238 performs various kinds of control necessary for the image examination process and the like in accordance with a control program stored in the memory 239. The memory 239 is a storage apparatus storing the control program and the like, and operates as a work area for the CPU 238.

The imaging unit 240 images a print medium after image forming conveyed thereto based on an instruction output from the CPU 238. The CPU 238 performs the image examination process, such as detection of a problem in the image formed on the print medium, by comparing the scanned image obtained by the imaging by the imaging unit 240 and the reference image stored in the HDD 272. The display unit 241 is a display apparatus including a liquid crystal display (LCD) or the like that displays image examination results, setting screens, and so on. The operation unit 242 accepts operations addressed to the inspection apparatus 109, such as input of various setting changes, input of various instructions such as an instruction to register a reference image, and the like from the operator. The HDD 272 is a storage apparatus storing the data of the reference image and the like. The HDD 272 is not an essential component, and the inspection apparatus 109 does not have to include the HDD 272. In the case where the inspection apparatus 109 does not include the HDD 272, for example, the data of the reference image may be stored in the HDD 221, and the inspection apparatus 109 may read the data of the reference image out of the HDD 221 into the memory 239 at the time of performing the image examination process.

Next, a hardware configuration of the large-capacity stacker 110 of the image forming apparatus 101 will be described. The large-capacity stacker 110 includes a communication I/F 244, a CPU 245, a memory 246, and a sheet discharge control unit 247. The above pieces of hardware included in the large-capacity stacker 110 are communicatively connected to one another through a system bus 248. The communication I/F 244 is connected to the printing apparatus 107 through the communication cable 254, and receives signals for controlling the large-capacity stacker 110 through the communication cable 254. The CPU 245 performs various kinds of control necessary for a sheet discharge process and the like in accordance with a control program stored in the memory 246. The memory 246 is a storage apparatus storing the control program and the like, and operates as a work area for the CPU 245. The sheet discharge control unit 247 performs control so as to convey a print medium conveyed thereto to a stack tray, an escape tray, or the subsequent finisher 111 based on an instruction signal output from the CPU 245.

Next, a hardware configuration of the finisher 111 of the image forming apparatus 101 will be described. The finisher 111 includes a communication I/F 249, a CPU 250, a memory 251, a sheet discharge control unit 252, and a finishing process unit 253. The above pieces of hardware included in the finisher 111 are communicatively connected to one another through a system bus 255. The communication I/F 249 is connected to the printing apparatus 107 through the communication cable 254, and receives signals for controlling the finisher 111. The CPU 250 performs various kinds of control necessary for a finishing process, a sheet discharge process, and the like in accordance with a control program stored in the memory 251. The memory 251 is a storage apparatus storing the control program and the like, and operates as a work area for the CPU 250. The sheet discharge control unit 252 controls the conveyance and discharge of print media based on an instruction from the CPU 250. The finishing process unit 253 controls the finishing process, such as stapling, punching, or saddle stitching, based on an instruction signal output from the CPU 250.

Next, a hardware configuration of the external controller 102 will be described. The external controller 102 includes a CPU 208, a memory 209, an HDD 210, a keyboard 211, a display 212, a LAN OF 213, a LAN OF 214, and a video I/F 215. The above pieces of hardware included in the external controller 102 are communicatively connected to one another through a system bus 216. The CPU 208 comprehensively performs various processes such as receiving data from the user terminal 103, performing the rasterization process, and sending a print job and the like to the image forming apparatus 101, based on programs and data stored in the HDD 210. The memory 209 stores programs, data, and the like which the CPU 208 needs to perform various processes, and operates as a work area for the CPU 208. The HDD 210 stores programs and data necessary for operations such as a print process. The keyboard 211 is an apparatus that accepts input operations from the operator addressed to the external controller 102. The keyboard 211 is not limited to what is called "keyboard" as long as it is an apparatus that accepts input operations from the operator, and may be a pointing device, a touch sensor, or the like.

The display 212 is a display apparatus including an LCD or the like, and receives information output by a program or the like run on the external controller 102 and the like as an image signal of a still image or a moving image and displays that image. The LAN I/F 213 is connected to the user terminal 103 through the second communication line 104 and receives signals such as print instructions through the second communication line 104. The LAN OF 214 is connected to the image forming apparatus 101 through the first communication line 105 and sends signals such as print jobs as print instructions and the like. The video OF 215 is connected to the image forming apparatus 101 through the video cable 106 and sends image data being rasterized print data and the like through the video cable 106.

Next, a hardware configuration of the user terminal 103 will be described. The user terminal 103 is an information processing apparatus such as a personal computer (PC), a smartphone, or a tablet terminal. The user terminal 103 includes a CPU 201, a memory 202, an HDD 203, a keyboard 204, a display 205, and a LAN OF 206. The above pieces of hardware included in the user terminal 103 are communicatively connected to one another through a system bus 207. The CPU 201 generates print data and print instruction commands based on various programs such as a document processing program stored in the HDD 203. The CPU 201 also comprehensively controls the above pieces of hardware connected to the system bus 207. The memory 202 stores programs, data, and the like which the CPU 201 needs to perform various processes, and operates as a work area for the CPU 201. The HDD 203 stores programs and data necessary for a print process and the like.

The keyboard 204 is an apparatus that accepts input operations from the operator addressed to the user terminal 103. The keyboard 204 is not limited to what is called "keyboard" as long as it is an apparatus that accepts input operations from the operator, and may be a pointing device, a touch sensor, or the like. The display 205 is a display apparatus including an LCD or the like, and receives information output by an application program or the like run on the user terminal 103 and the like as an image signal of a still image or a moving image and displays that image. The LAN OF 206 is connected to the external controller 102 through the second communication line 104 and sends signals such as print data and print instructions through the second communication line 104.

In the above description, the external controller 102 and the image forming apparatus 101 are connected by the first communication line 105 and the video cable 106, but the connection between the external controller 102 and the image forming apparatus 101 is not limited to this. Specifically, a configuration that can send and receive data necessary for printing may suffice, and a connection configuration with only one of the first communication line 105 or the video cable 106 may be employed. Also, it suffices that each of the memories 202, 209, 223, 234, 239, 246, and 251 be a storage apparatus for storing data and programs. Specifically, each of these may be a volatile random access memory (RAM), a non-volatile read only memory (ROM), an internal or external HDD, a universal serial bus (USB) memory, or the like.

Figure 3:
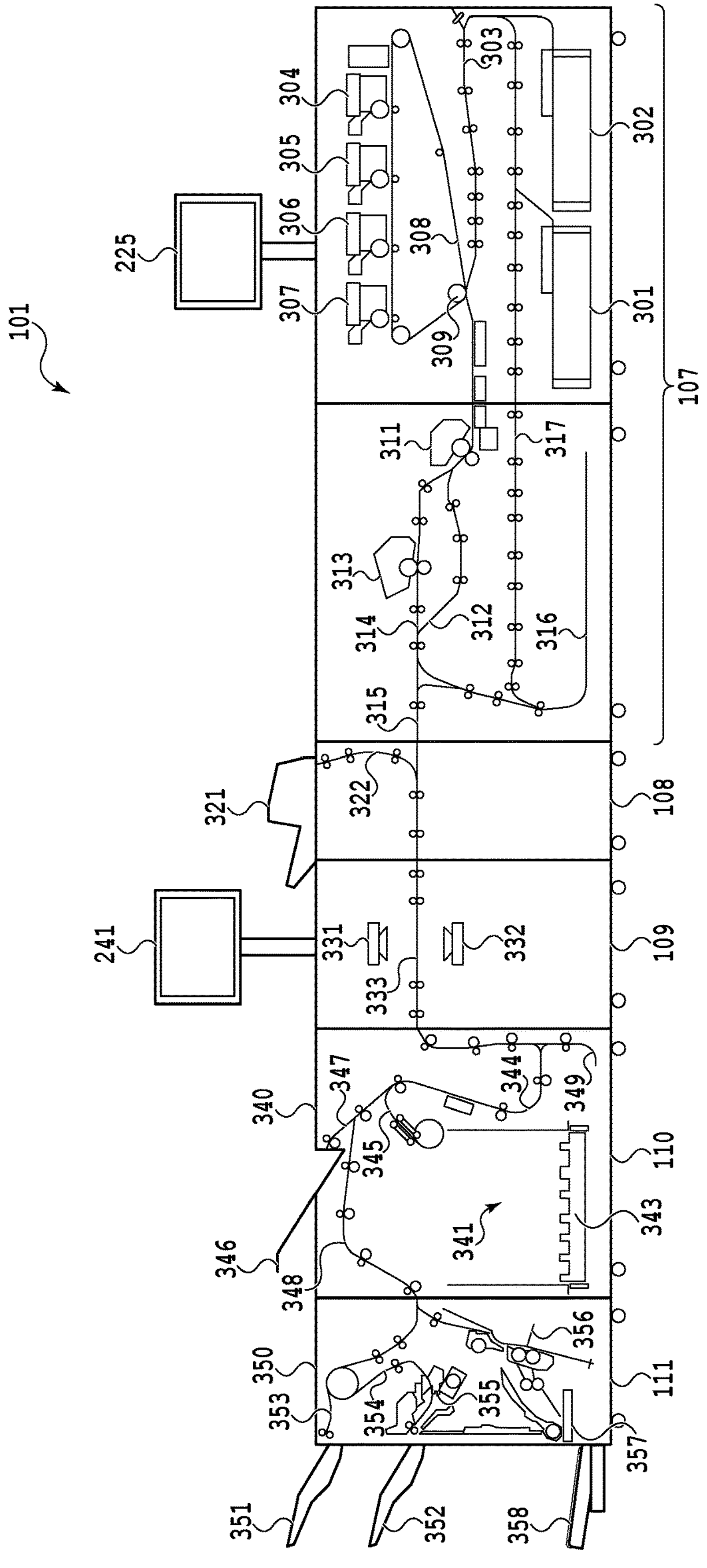
FIG. 3 is a cross-sectional view illustrating an example of an internal structure of the image forming apparatus.

FIG. 3 is a cross-sectional view illustrating an example of an internal structure of the image forming apparatus 101 according to Embodiment 1. The printing apparatus 107 is a printing apparatus that forms an image on a print medium. Print media to be used in the image forming are stored in sheet feed decks 301 and 302 based on their types. Using the operation unit 224, the operator can input and set information such as the print medium size and type of the print media stored in each of the sheet feed decks 301 and 302. Of the one or more print media stored in each of the sheet feed decks 301 or 302, the print medium located at the top position or the like is conveyed to a conveyance path 303. Development stations 304 to 307 form toner images using toners corresponding to Y, M, C, and K in order to form color images. The formed toner images are subjected to primary transfer onto an intermediate transfer belt 308, and the intermediate transfer belt 308 is rotated in the clockwise direction in FIG. 3. At a secondary transfer position 309, the toner images are transferred onto the print medium conveyed through the conveyance path 303.

A fixing unit 311 fixes the toner images to the print medium. Specifically, the fixing unit 311 includes a pressure roller and a heat roller, and fixes the toner images to the print medium by fusing the toners and attaching them by compression as the print medium passes between the rollers. After passing the fixing unit 311, the print medium is conveyed to a conveyance path 315 through a conveyance path 312. Depending on the type of the print medium, further fusion and compression attachment may be required to fix the toners. In this case, after passing the fixing unit 311, the print medium is conveyed to a second fixing unit 313 through a conveyance path 314. At the second fixing unit 313, the print medium is subjected to additional fusion and compression attachment, and then conveyed to the conveyance path 315 through the conveyance path 314. In a case where the image forming mode is duplex printing, the print medium is conveyed to a print medium reversing path 316 and reversed through the print medium reversing path 316. Thereafter, the print medium is conveyed to a duplex printing conveyance path 317, and the second surface is subjected to image transfer at the secondary transfer position 309.

The inserter 108 includes an inserter tray 321, and conveys an insertion sheet placed on the inserter tray 321 to the conveyance path 315 through a conveyance path 322. In this way, a series of print media conveyed from the printing apparatus 107 can be conveyed to the subsequent apparatus with insertion sheets inserted at any positions in and on the group of print media. Each print medium having passed the inserter 108 is conveyed to the inspection apparatus 109. Inside the inspection apparatus 109, cameras 331 and 332 are disposed so as to face each other. The camera 331 is an imaging apparatus for reading the upper surface of the print medium, and the camera 332 is an imaging apparatus for reading the lower surface of the print medium. In a case where the print medium conveyed through a conveyance path 333 reaches a predetermined position, the inspection apparatus 109 reads the image formed on the print medium by using at least one of the cameras 331 and 332. The inspection apparatus 109 performs the image examination process by determining whether the image forming by the printing apparatus 107 was normal based on the scanned image obtained by this reading. The display unit 241 displays the result of the image examination performed by the inspection apparatus 109 and the like.

The large-capacity stacker 110 is a stacker that can be loaded with a large number of print media after image forming. After passing the inspection apparatus 109, the print medium is conveyed to the large-capacity stacker 110 through a conveyance path 344. The large-capacity stacker 110 has a stack tray 341. A print medium with a formed image thereon determined to be normal in the image examination process by the inspection apparatus 109 is passed through a conveyance path 345 from the conveyance path 344 and loaded onto the stack tray 341. The large-capacity stacker 110 also has an escape tray 346. A print medium with a formed image thereon determined to be not normal in the image examination process by the inspection apparatus 109 is conveyed through the conveyance path 344 and a conveyance path 347 and discharged onto the escape tray 346.

The print medium is conveyed through a conveyance path 348 in a case of conveying the print medium directly to the apparatus subsequent to the large-capacity stacker 110 without loading it onto the stack tray 341. A reversing section 349 reverses the print medium. The reversing section 349 is used in the case of loading the print medium onto the stack tray 341. For example, the large-capacity stacker 110 reverses the print medium through the reversing section 349 in a case of loading the print medium onto the stack tray 341 such that the orientation of the print medium conveyed to the large-capacity stacker 110 will be the same as the orientation of the print medium at the time of being output. The large-capacity stacker 110 does not reverse the print medium through the reversing section 349 in a case of conveying the print medium to the escape tray 346 or directly conveying the print medium to the subsequent apparatus without loading it onto the stack tray 341.

The finisher 111 includes sheet discharge trays 351 and 352. The print medium conveyed from the large-capacity stacker 110 is conveyed through a conveyance path 353 or 354 and discharged onto the sheet discharge tray 351 or 352. In a case of performing a finishing process such as stapling, the print medium conveyed from the large-capacity stacker 110 is conveyed to a processing unit 355 through the conveyance path 354. At the processing unit 355, the print medium is subjected to the designated finishing process and then output onto the sheet discharge tray 352. The finisher 111 is capable of raising and lowering the sheet discharge trays 351 and 352. For example, the finisher 111 is capable of lowering the sheet discharge tray 351 to the position of the sheet discharge tray 352 in FIG. 3 and discharging the print medium after the finishing process onto the sheet discharge tray 351.

In a case where saddle stitching is designated as the finishing process, the finisher 111 conveys print media conveyed from the large-capacity stacker 110 to a saddle stitching unit 356. Moreover, at the saddle stitching unit 356, stapling is performed on the center of the print media, and the print media are then folded in half. The saddle-stitched print media are conveyed through a conveyance path 357 and discharged onto a saddle stitching tray 358. For example, a belt conveyor or the like is disposed on the saddle stitching tray 358, and a bundle of saddle-stitched print media placed on the saddle stitching tray 358 is conveyed toward the left of the saddle stitching tray 358 in FIG. 3.

Figure 4:
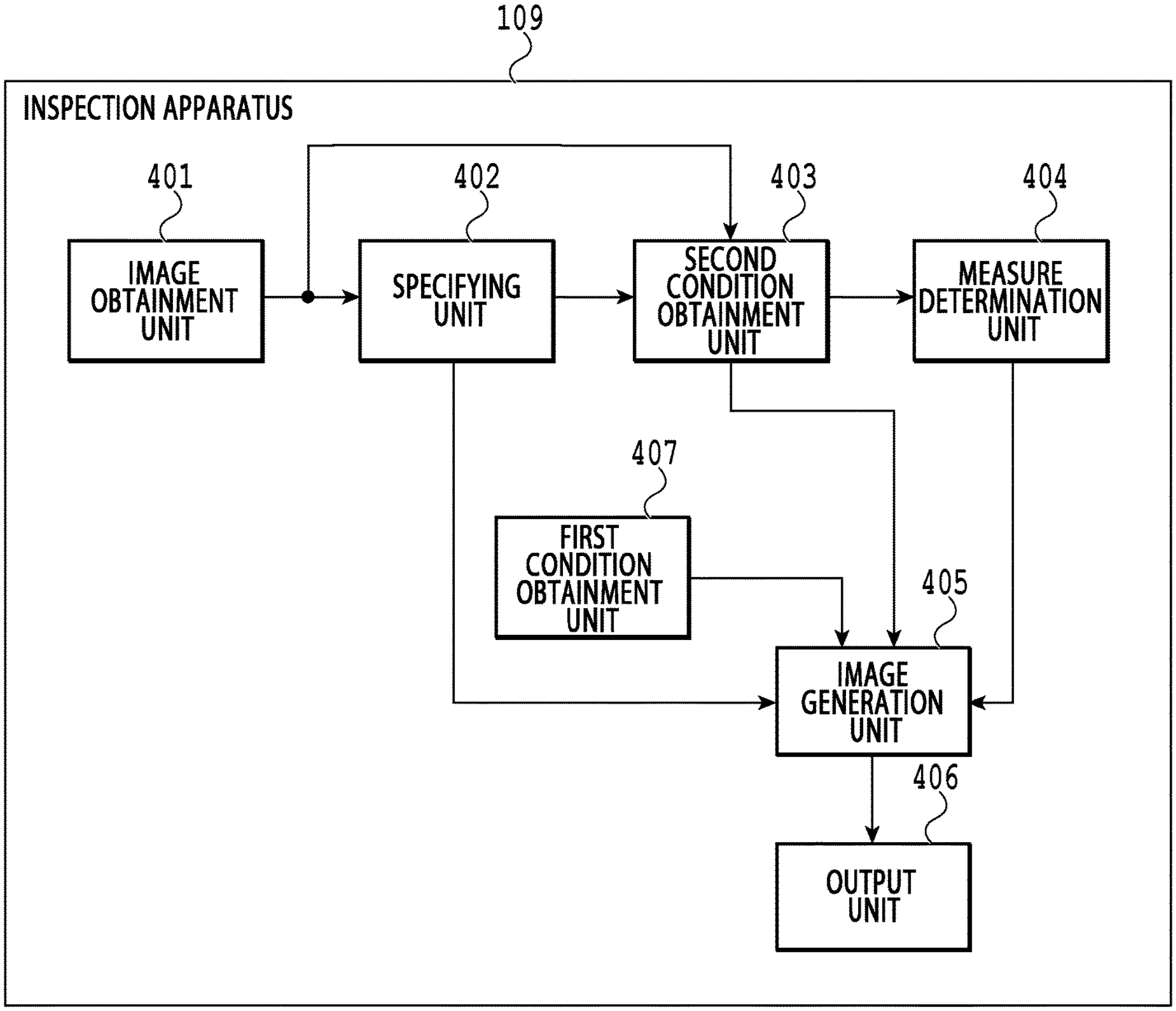
FIG. 4 is a block diagram illustrating an example of a functional configuration of an inspection apparatus.

FIG. 4 is a block diagram illustrating an example of a functional configuration of the inspection apparatus 109 according to Embodiment 1. The inspection apparatus 109 includes, as its functional configuration, a first condition obtainment unit 407, an image obtainment unit 401, an specifying unit 402, a second condition obtainment unit 403, a measure determination unit 404, an image generation unit 405, and an output unit 406. Processes by the first condition obtainment unit 407, the image obtainment unit 401, the specifying unit 402, the second condition obtainment unit 403, the measure determination unit 404, the image generation unit 405, and the output unit 406 are performed by software using the CPU 238 and the memory 239.

The first condition obtainment unit 407 obtains information indicating conditions of one or more constituent parts of the printing apparatus 107 specified based on the lives of the parts (hereinafter referred to as "first condition information"). For example, first, the first condition obtainment unit 407 obtains information indicating the lifetime number of uses of each constituent part of the printing apparatus 107, the number of uses of the constituent part until it needs cleaning (hereinafter referred to as "number of uses until cleaning"), and the current number of uses of the constituent part since it was replaced or cleaned (hereinafter referred to as "current number of uses"). These pieces of information are stored in the HDD 221 of the printing apparatus 107, the HDD 272 of the inspection apparatus 109, or the like. Here, the current number of uses corresponds to the number of times image forming has been performed since the corresponding part was replaced or cleaned, and the information indicating the current number of uses is incremented each time the printing apparatus 107 performs image forming.

Subsequently, the first condition obtainment unit 407 compares the lifetime number of uses or the number of uses until cleaning with the current number of uses to specify the condition of the part. For example, the first condition obtainment unit 407 calculates the ratio of the current number of uses to the lifetime number of uses or the ratio of the current number of uses to the number of uses until cleaning and obtains this ratio as the first condition information. This ratio indicates the degree of tear and wear of the part, which is an indication of the life of the part serving as a indication for replacement or cleaning of the part. In the present embodiment, a description is given of a configuration in which the first condition obtainment unit 407 obtains the information indicating the lifetime number of uses, the number of uses until cleaning, and the current number of uses and calculates the first condition information using these pieces of information obtained, but the configuration is not limited to this one. For example, the first condition obtainment unit 407 may obtain the information indicating the lifetime number of uses, the number of uses until cleaning, and the current number of uses as the first condition information. Also, the CPU 222 of the printing apparatus 107 may calculate the ratio mentioned above, and the first condition obtainment unit 407 may obtain information indicating the ratio calculated by the CPU 222 as the first condition information.

The first condition obtainment unit 407 may obtain information, as the first condition information, indicating the lifetime period of use the part, the period of use of the part until it needs to be cleaned (hereinafter referred to as "period of use until cleaning"), and the current period of use of the part since it was replaced or cleaned (hereinafter referred to as "current period of use"). The first condition obtainment unit 407 may calculate the ratio of the current period of use to the lifetime period of use or the ratio of the current period of use to the period of use until cleaning and obtain this ratio as the first condition information. This ratio indicates the degree of tear and wear of the part, which is an indication of the life of the part serving as a indication for replacement or cleaning of the part. Also, the CPU 222 of the printing apparatus 107 may calculate the ratio mentioned above, and the first condition obtainment unit 407 may obtain information indicating the ratio calculated by the CPU 222 as the first condition information.

In the present embodiment, the condition of each part is calculated using the number of times image forming has been performed or the period of use, but the calculation is not limited to this manner. An accurate condition of each part may be calculated using various kinds of information such as the distance of travel of sheets, the length of time of continuous operation, and so on.

The image obtainment unit 401 obtains the data of a reference image and the data of a scanned image obtained by imaging by the camera 331 or 332. Specifically, the image obtainment unit 401 instructs the camera 331 or 332 to perform imaging in accordance with the timing with which an image-formed print medium is conveyed through the conveyance path 333, and obtains the data of the scanned image obtained by the imaging. The specifying unit 402 specifies the state of a problem in the scanned image, if any, based on the data of the scanned image obtained by the image obtainment unit 401. Specifically, the specifying unit 402 compares the reference image and the scanned image with each other to determine whether there is a problem in the scanned image and, in a case where there is a problem in the scanned image, specifies the state of the problem in the scanned image. The state of the problem in the scanned image is, for example, the form of a problem in the scanned image such as whether it is a positional shift of the scanned image, a vertical or horizontal streak in the scanned image, or soiling of the scanned image.

The second condition obtainment unit 403 obtains information indicating the conditions of one or more parts specified based on the scanned image (hereinafter referred to as "second condition information"). Specifically, first, the second condition obtainment unit 403 specifies the conditions of one or more parts causing the problem in the scanned image among the multiple constituent parts of the printing apparatus 107 based on the information indicating the state of the problem in the scanned image specified by the specifying unit 402. For example, the second condition obtainment unit 403 refers to a correspondence table prepared in advance and specifies the one or more parts causing the problem in the scanned image that correspond to the form of the problem, as well as the conditions of those parts. Moreover, the second condition obtainment unit 403 obtains information indicating the conditions of the specified parts as the second condition information.

The measure determination unit 404 determines a measure to be taken against the cause of the problem in the scanned image to remedy the problem. For example, the measure determination unit 404 determines a measure to be taken against the cause of the problem by referring a correspondence table in which causes of problems and respective measures to be taken against the causes are associated with one another. Specific examples of the measure to be taken include part replacement or cleaning, automatic restoration, and the like. Based on the first condition information obtained by the first condition obtainment unit 407 and the second condition information obtained by the second condition obtainment unit 403, the image generation unit 405 generates a display image representing the conditions of the one or more parts indicated by the first condition information and the conditions of the one or more parts indicated by the second condition information, or the like. The output unit 406 outputs a signal representing the display image generated by the image generation unit 405 to the display unit 241 to display the display image on the display unit 241.

Figure 5A:
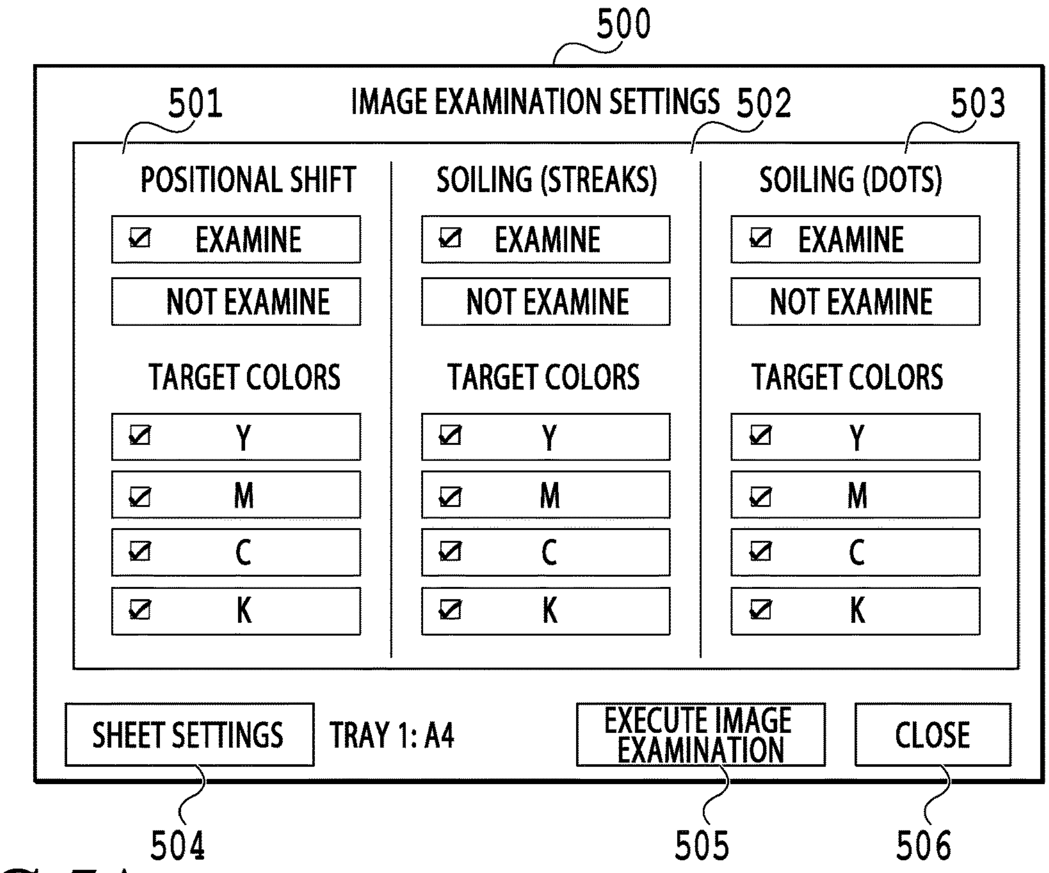
FIGS. 5A to 5D are diagrams illustrating an example of display images to be displayed on a display unit by the inspection apparatus.

FIGS. 5A to 5D are diagrams illustrating an example of display images to be displayed on the display unit 241 by the inspection apparatus 109 according to Embodiment 1. The display images illustrated in FIGS. 5A to 5D may be displayed on the display 225 of the printing apparatus 107 or the display 212 of the external controller 102. FIG. 5A is an example of a display image corresponding to a setting screen 500 for configuring settings of the image examination process. The setting screen 500 includes setting regions 501, 502, and 503, a sheet setting button 504, an examination execution button 505, and a close button 506.

Each of the setting regions 501, 502, and 503 is a region for setting an item to be subjected to the image examination process. The setting region 501 is a region for setting whether to conduct an image examination for specifying the cause of a positional shift. The setting region 502 is a region for setting whether to conduct an image examination for specifying the cause of soiling appearing in the form of a streak(s). The setting region 503 is a region for setting whether to conduct an image examination for specifying the cause of soiling appearing in the form of spread dots. Whether to perform an examination can be set for each of the above causes. For each item, an option to examine the cause and an option to not examine the cause are alternatively expressed by means of a toggle. For each item set to be examined, the colors of the examination target can be set. As the target colors, the colors used in the image forming can be individually set. For example, the toner colors Y, M, C, and K can be individually set. As for the setting of each toner color, the toner color is selected by pressing it once and is unselected by pressing it again.

The sheet setting button 504 is a button for configuring print medium settings. The examination execution button 505 is a button for executing the image examination process. The close button 506 is a button for closing the setting screen 500. In a case where the operator presses the sheet setting button 504, the inspection apparatus 109 displays a display image corresponding to a sheet setting screen not illustrated on the display unit 241. The operator can refer to the sheet setting screen and set the print medium to be used in the image examination. The set content is displayed near the sheet setting button 504, for example. FIG. 5A exemplarily illustrates a mode in which the print medium is designated by a name which can specify the tray storing the print medium, and illustrates a state where a tray 1 is selected and the A4 print medium stored in the tray 1 is designated. In a case where the operator presses the examination execution button 505, the image examination process is executed using the settings in the setting regions 501, 502, and 503 and the print medium setting set by pressing the sheet setting button 504. In a case where the operator presses the close button 506, the inspection apparatus 109 closes the setting screen 500 without executing the image examination process and, for example, switches the display to the screen which was displayed before transitioning to the setting screen 500.

Figure 5B:
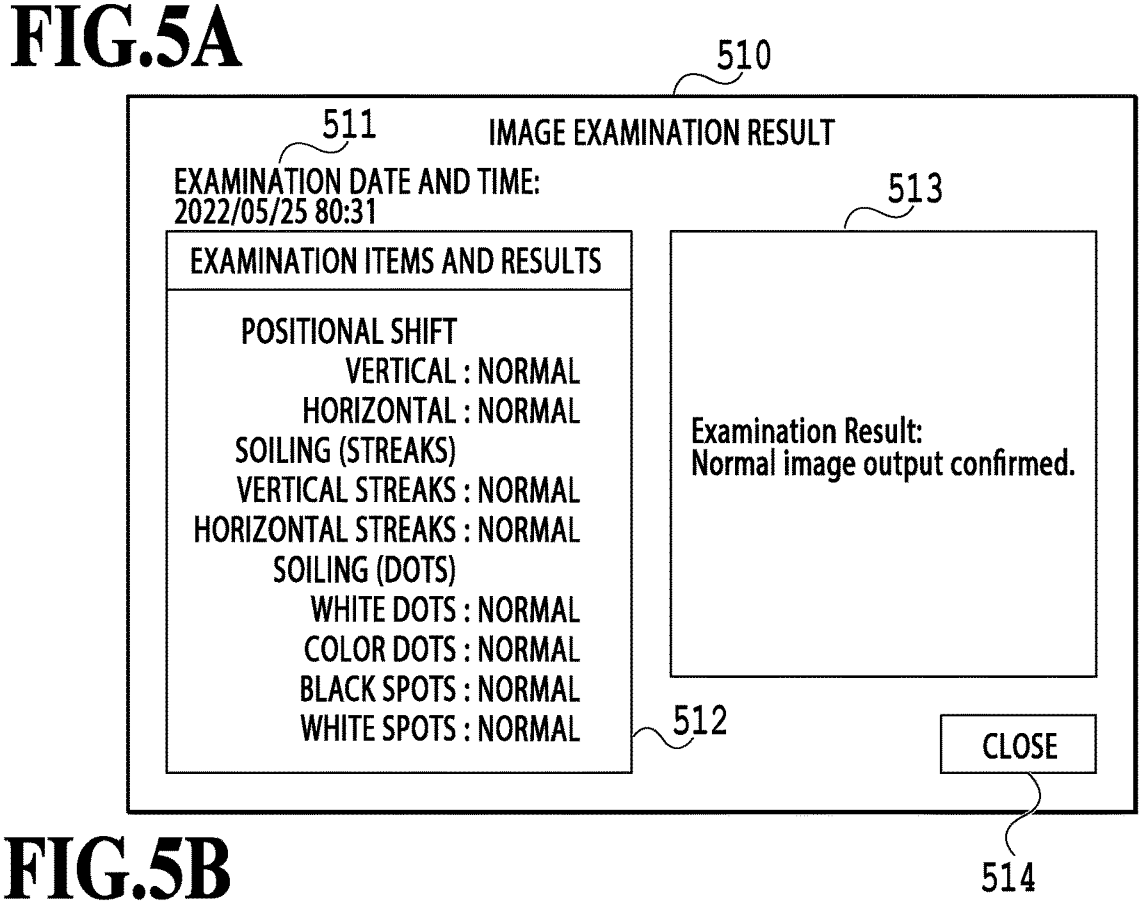
Figure 5C:
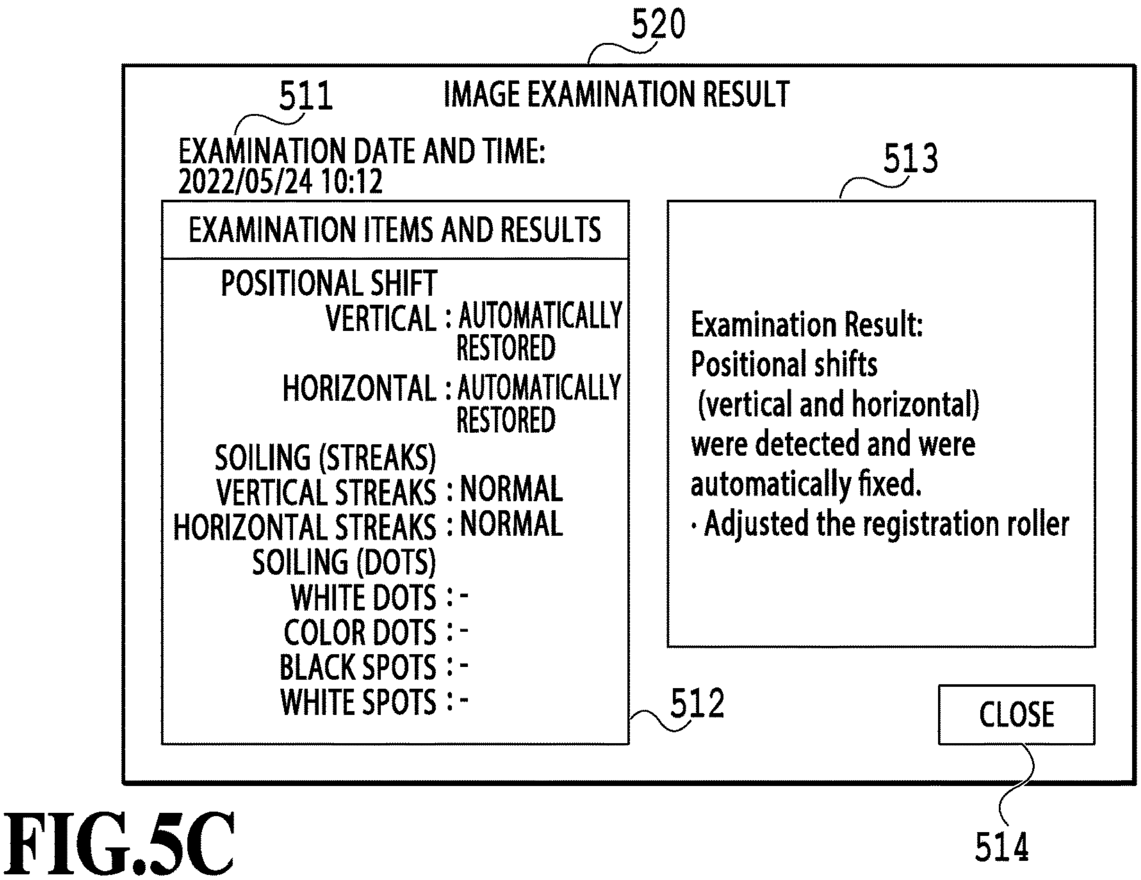
Figure 5D:
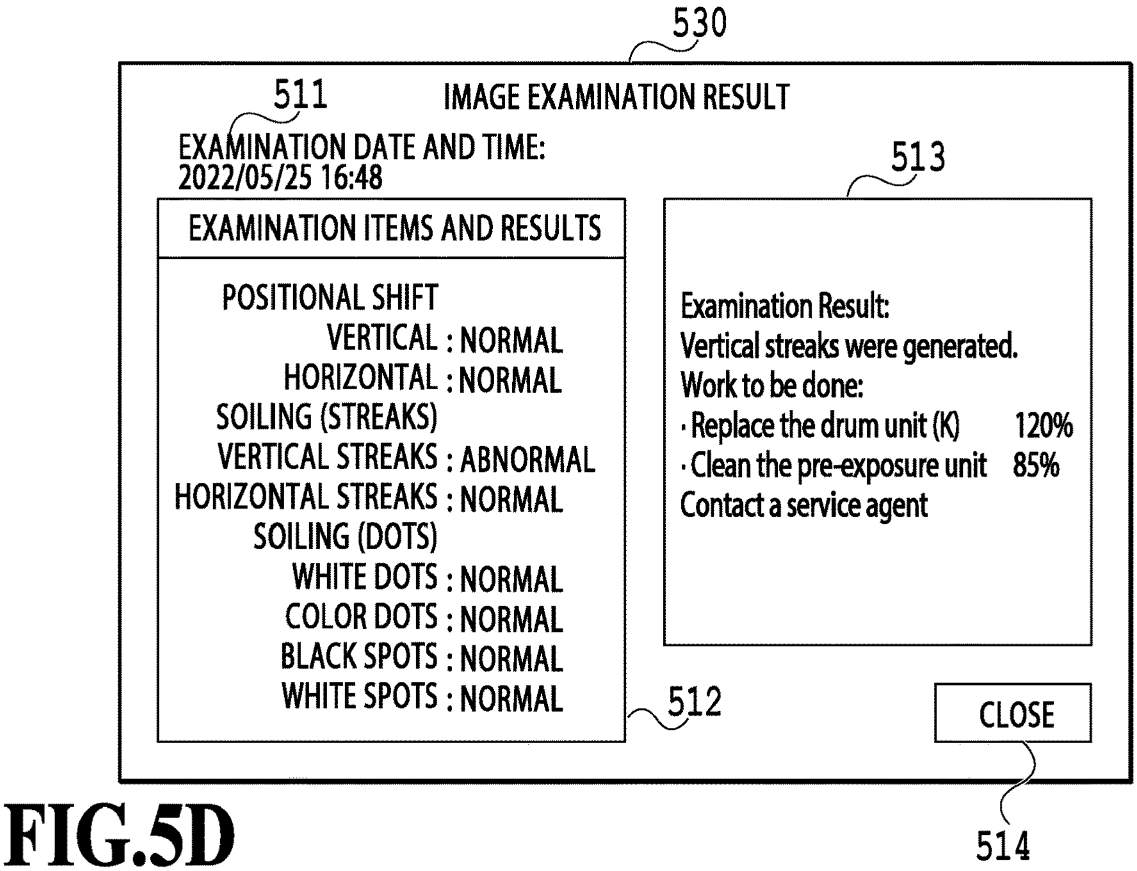

FIGS. 5B, 5C, and 5D are an example of display images corresponding to examination result screens 510, 520, and 530 for checking the result of the image examination process. The examination result screen 510 illustrated in FIG. 5B represents an example of a case where the result of the image examination was normal, that is, a case where there was no problem in the scanned image. The examination result screen 520 illustrated in FIG. 5C represents an example of a case where an image forming problem due to a positional shift was detected as a result of executing the image examination process, and the detected positional shift was automatically fixed. The examination result screen 530 illustrated in FIG. 5D represents an example of a case where an image forming problem due to the presence of a vertical streak, which is one of the examination items of streaky soiling, was detected as a result of executing the image examination process.

The examination result screens 510, 520, and 530 each include a display region 511 for the examination date and time, a display region 512 for the image examination result for each item, a display region 513 for the overall image examination result, and a close button 514. The display region 511 displays the date and time at which the image examination process was executed or the date and time at which the result of the image examination was determined. The display region 512 displays a detailed examination result of each item subjected to the image examination and, for example, displays the results of one or more, more detailed examination items for each of the items set in the setting regions 501, 502, and 503. For example, the detailed examination results in the display region 512 are each displayed using one of "Normal", "Abnormal", "Automatically restored", or "–" indicating that the item was not an examination target. The display region 513 displays an overall image examination result taking the examination result of each item into account. In this example, a message with a specific description is displayed so that the operator can recognize the overall result. In a case where the operator presses the close button 514, the inspection apparatus 109 closes the examination result screen 510 and, for example, switches the display to the screen which was displayed before transitioning to the examination result screen 510.

FIG. 5C exemplarily illustrates the examination result screen 520 with the display region 512 displaying "Automatically restored" for the items "Vertical" and "Horizontal" under the item "Positional Shift", and the display region 513 displaying a description indicating that the positional shifts were automatically fixed. Likewise, FIG. 5D exemplarily illustrates the examination result screen 530 with the display region 512 displaying "Abnormal" indicating that an abnormality was found for the item "Vertical Streak" under the item "Streaky Soiling" detected as a problem. FIG. 5D also exemplarily illustrates the examination result screen 530 with the display region 513 displaying the item corresponding to the detected problem, the names of the parts that caused the problem, and the content of work for addressing the problem. The work for addressing the problem may include multiple kinds of work. For example, the display region 513 illustrated in FIG. 5D displays the two contents of work "Replace the drum unit (K)" indicating that the drum unit (K) needs to be replaced and "Clean the pre-exposure unit" indicating the pre-exposure unit needs to be cleaned.

The display region 513 illustrated in FIG. 5D also displays the degrees of tear and wear of the two parts that need to be replaced or cleaned. Specifically, the degree of tear and wear of the drum unit (K) indicates that the use condition is 120%, meaning that the number of uses or period of use set as a indication for replacement has been exceeded by 20%. Similarly, the degree of tear and wear of the pre-exposure unit indicates that the number of uses or period of use set as a indication for cleaning has not been reached yet, and the use condition is 85%.

Displaying the degree of tear and wear makes it easier for the operator to determine whether the image forming problem has occurred due to the wear and tear of the part or due to malfunction of the part, or the like. This enables the operator to perform management work such as maintenance of parts of the printing apparatus 107 in an integrated manner. The displaying also makes it easier for the operator determine the order of priority in performing tasks. As the content of work in the display region 513, only a content of work that can be performed by the operator may be displayed. As for work which can only be performed by a user other than the operator such as a service engineer (hereinafter referred to simply as "service engineer"), the contact information of a service engineer who can perform the work or the like may be displayed. Incidentally, FIG. 5D is an example of a case where the operator can perform all contents of work. In the present embodiment, the degree of tear and wear of one or more parts is displayed, but displaying the degrees of tear and wear of the parts is a mere example, and the configuration is not limited to this manner. For example, the number of uses or period of use after part replacement or cleaning and the number of uses or period of use set as a indication for replacement or cleaning may be displayed in such a manner that the operator can compare them with each other.

Figure 6:
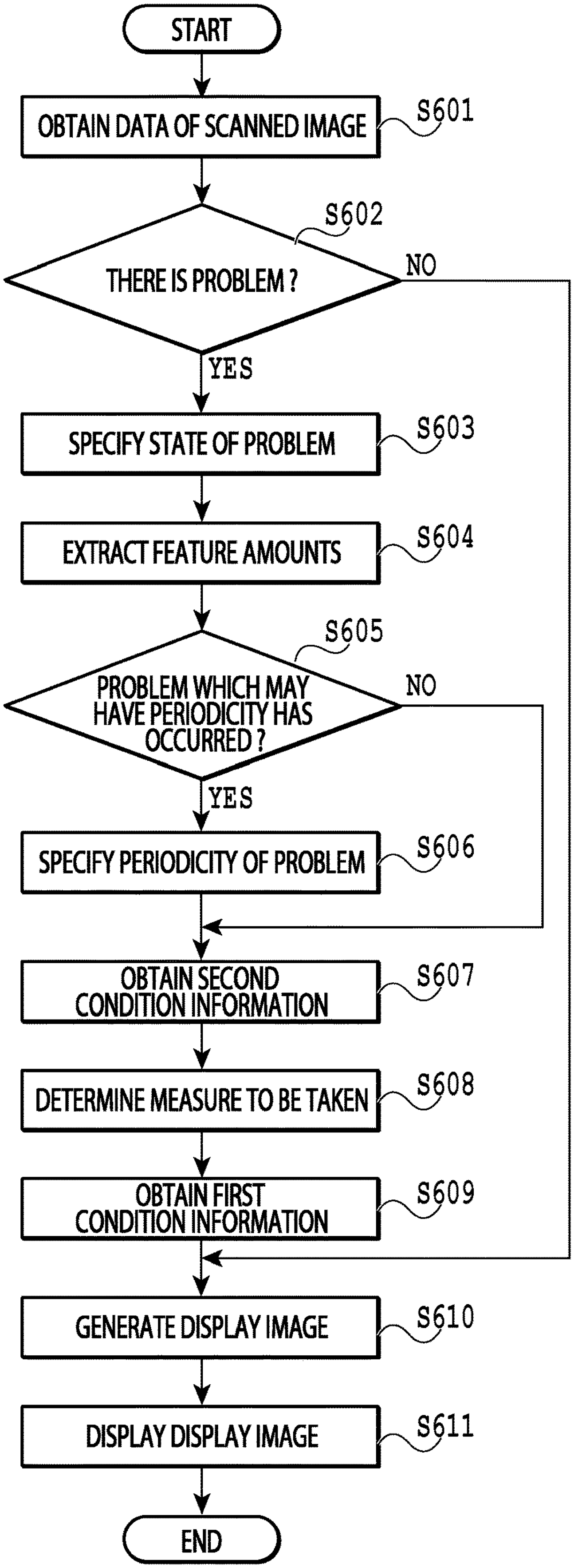
FIG. 6 is a flowchart illustrating an example of a process flow by the inspection apparatus.

FIG. 6 is a flowchart illustrating an example of a process flow by the inspection apparatus 109 according to Embodiment 1. Note that each symbol "S" in the following description means a step. First, in S601, the image obtainment unit 401 obtains data of a scanned image. Specifically, for example, in S601, the operator firstly presses the examination execution button 505 exemplarily illustrated in FIG. 5A to input an operation for causing the printing apparatus 107 to print a test chart using the operation unit 242. In S601, in response to the input of the operation, the CPU 238 of the inspection apparatus 109 subsequently issues an instruction to print the test chart to the CPU 222 of the printing apparatus 107. The print instruction is determined based on the examination items set in the setting screen 500. For example, an instruction to print a test chart for each of the colors set in the examination items is issued.

The data of the image to be printed as the test chart may be stored in the HDD 221 of the printing apparatus 107 or the like or stored in the HDD 272 of the inspection apparatus 109 or the like. In the case where the data of the image to be printed as the test chart is stored in the HDD 272 of the inspection apparatus 109 or the like, the data is sent to the printing apparatus 107 along with the print instruction, for example. In S601, the image obtainment unit 401 subsequently instructs the camera 331 or 332 to read the test chart formed on a print medium in accordance with the timing with which the print medium is conveyed through the conveyance path 333. Here, the number of print media to be conveyed on which a test chart is formed varies depending on the examination item settings. Hence, an instruction to perform the reading process is issued as many times as the number of test charts in the above print instruction. In S601, the image obtainment unit 401 subsequently obtains the data obtained by reading the test chart as the data of the scanned image and stores it in the HDD 272 or the like.

After S601 is S602, in which the specifying unit 402 determines whether there is a problem in the scanned image obtained in S601. If determining in S602 that there is a problem in the scanned image obtained in S601, then in S603, the specifying unit 402 specifies the state of the problem in the scanned image. Specifically, the specifying unit 402 specifies the form of the problem, such as whether it is a positional shift of the scanned image, a vertical or horizontal streak in the scanned image, or soiling of the scanned image.

The form of the problem in the scanned image is specified by determining, for each of the features of the above-listed problem forms, whether the feature is present in the scanned image, for example. The specifying method is not limited to the above method. For example, the specifying unit 402 may compare a reference image of the test chart stored in the HDD 272 of the inspection apparatus 109 or the like and the scanned image obtained in S601, and specify the form of the problem in the scanned image based on the difference between the two images. In a case where there are multiple scanned images with a problem, the forms of the problems in the scanned images may be specified individually or collectively. For example, the specifying unit 402 specifies the form of the problem in each scanned image by specifying the presence or absence of a problem in the scanned image based on each problem form.

After S603 is S604, in which the second condition obtainment unit 403 extracts feature amounts corresponding to the form of the problem in the scanned image specified in S603 from the scanned image. In a case where the form of the problem in the scanned image is, for example, a streaky defect, the feature amounts to be extracted are information indicating the number of streaks, the positions of the streaks, the widths of the streaks, the periodic intervals of the streaks, and so on. The second condition obtainment unit 403 stores the extracted feature amounts in the HDD 272 or the like.

After S604 is S605, in which the second condition obtainment unit 403 determines whether a problem which may have periodicity has occurred based on the form of the problem in the scanned image specified in S603 and the feature amounts extracted in S604. If determining in S605 that a problem which may have periodicity has occurred, then in S606, the second condition obtainment unit 403 specifies the periodicity of the problem based on the form of the problem in the scanned image specified in S603 and the feature amounts extracted in S604. For example, in a case where the form of the problem in the scanned image is a streaky defect, the second condition obtainment unit 403 specifies the intervals of the positions at which the streaks are generated as the periodic intervals of the streaks based on the positions and number of generated streaks extracted as the feature amounts. The second condition obtainment unit 403 stores the specified information on the periodic intervals of the streaks in the HDD 272 or the like.

After S606 or if determining in S605 that a problem which may have periodicity has not occurred, the second condition obtainment unit 403 obtains the second condition information in S607. Specifically, in S607, the second condition obtainment unit 403 firstly specifies the conditions of the one or more parts causing the problem in the scanned image. For example, after S606, the second condition obtainment unit 403 specifies the conditions of the one or more parts causing the problem in the scanned image based on the form of the problem in the scanned image specified in S603, the feature amounts extracted in S604, and the periodicity of the problem specified in S606. Also, if determining in S605 that a problem which may have periodicity has not occurred, the second condition obtainment unit 403 specifies the conditions of the one or more parts causing the problem in the scanned image based on the form of the problem specified in S603 and the feature amounts extracted in S604.

For example, the second condition obtainment unit 403 specifies the conditions of the one or more parts causing the problem in the scanned image by referring to a correspondence table in which, for each problem form, feature amounts to be extracted and the condition of one or more parts causing the problem are associated with each other in advance. In S607, the second condition obtainment unit 403 subsequently obtains information indicating the specified conditions of the one or more parts causing the problem in the scanned image as the second condition information, and stores the obtained second condition information in the HDD 272 or the like.

After S607 is S608, in which the measure determination unit 404 determines a measure to be taken to remedy the problem based on the cause of the problem specified in S607. In a case where the determined measure to be taken includes automatic restoration, the measure determination unit 404 may determine the content of the automatic restoration, and the inspection apparatus 109 may instruct the printing apparatus 107 to implement the content. In this case, the printing apparatus 107 performs the automatic restoration with the above content, and the inspection apparatus 109 receives a notification indicating the completion of the automatic restoration from the CPU 222 of the printing apparatus 107 and stores restoration completion information indicating the completion of the automatic restoration in the HDD 272 or the like.

In a case where the determined measure to be taken includes work such as part replacement or cleaning, the measure determination unit 404 stores part information indicating the one or more parts that need the work, such as replacement or cleaning, and work information indicating the content of the work for each part in the HDD 272 or the like. The measure determination unit 404 may send the part information and the work information to the printing apparatus 107 to store the part information and the work information in the HDD 221 of the printing apparatus 107 or the like in addition to the HDD 272 or the like. To perform the part replacement or cleaning, the power of the printing apparatus 107 needs to be turned off. In this case, the power of the whole image forming apparatus 101 may be turned off in conjunction with the power of the printing apparatus 107. By storing the part information and the work information in the HDD 221 of the printing apparatus 107, it is possible to track whether the part replacement or cleaning work has been done or not on the printing apparatus 107. Also, in a case where the part replacement or cleaning requires a service engineer's work, it may not be possible to perform the work immediately. In such a case, by storing the part information and the work information in the HDD 221 of the printing apparatus 107, information indicating the specified cause and the like can be held until a service engineer performs the work.

After S608 is S609, in which the first condition obtainment unit 407 obtains the first condition information. Specifically, for example, the first condition obtainment unit 407 obtains the first condition information indicating the conditions of the one or more parts causing the problem in the scanned image which are indicated by the second condition information. After S609 or if it is determined in S602 that there is no problem in the scanned image, in S610, the image generation unit 405 generates the display image exemplarily illustrated in FIG. 5B, 5C, or 5D based on the first condition information and the second condition information. After S610 is S611, in which the output unit 406 outputs a signal representing the display image generated in S610 to the display unit 241 to display the display image on the display unit 241.

In the case where the image examination result indicates that there is no problem in the scanned image, the image generation unit 405 generates the display image exemplarily illustrated in FIG. 5B, indicating that the image examination result was normal. In a case where the image examination result indicates that there is a problem in part of the scanned image, the image generation unit 405 generates a display image indicating that the scanned image is normal with items determined to be free of a problem, and has problems with items determined to contain problems. The image generation unit 405 may also refer to the restoration completion information and generate a display image indicating that automatic restoration has been performed for the items addressed by automatic restoration among the items determined to contain problems. Specifically, in a case where there is a problem in the scanned image, the image examination result and the cause of the problem are displayed in the display region 513 in the examination result screens 510, 520, and 530 exemplarily illustrated in FIGS. 5B, 5C, and 5D. In a case where a problem has been addressed by automatic restoration, the image examination result and the cause of the problem as well as the item addressed by the automatic restoration are displayed. In a case where there is no problem in the scanned image, information indicating that the image examination result was normal is displayed. After S611, the inspection apparatus 109 terminates the processing of the flowchart illustrated in FIG. 6.

Figure 7:
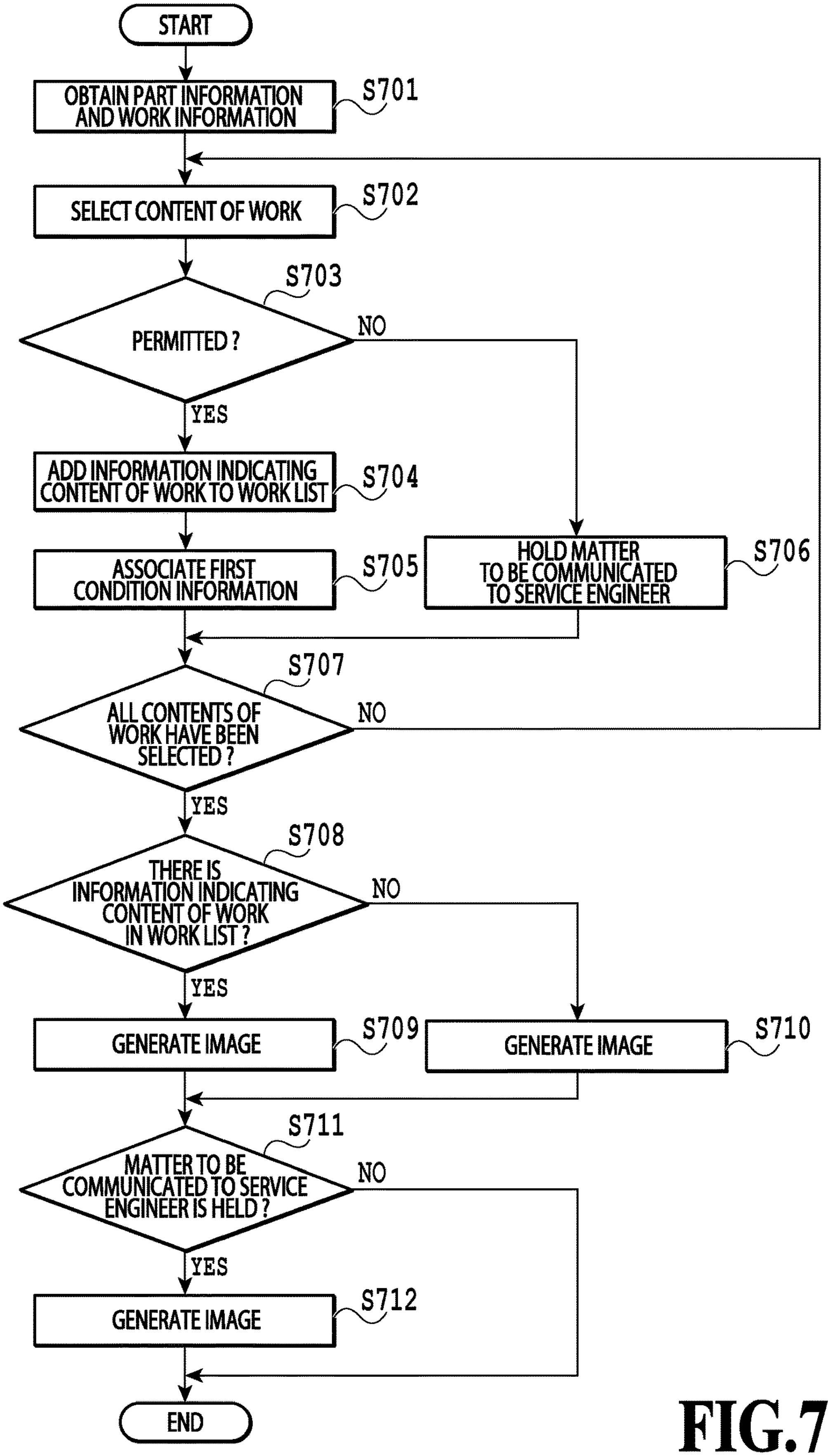
FIG. 7 is a flowchart illustrating an example of a process flow in a case where the inspection apparatus generates an image in a display region in an examination result screen to be displayed on the display unit.

FIG. 7 is a flowchart illustrating an example of a process flow in a case where the inspection apparatus 109 according to Embodiment 1 generates the image in the display region 513 in the examination result screen 510, 520, or 530 to be displayed on the display unit 241. The flowchart illustrated in FIG. 7 is executed as part of the process of S609 illustrated in FIG. 6 in a case where there is a problem in the scanned image. First, in S701, the image generation unit 405 reads out and obtains the part information and the work information stored in the HDD 272 or the like. In a case where neither part information nor work information is stored in the HDD 272 or the like, the image generation unit 405 may terminate the processing of the flowchart illustrated in FIG. 7 without executing the subsequent processes. Then, in S702, the image generation unit 405 selects one content of work from among the contents of work associated with parts which are indicated in the work information obtained in S701.

Then, in S703, the image generation unit 405 determines whether the content of work selected in S702 is permitted as work to be performed by the operator. Whether the work is performed to be performed by the operator is set in advance by a service engineer, for example. A setting value for that is, for example, stored in the HDD 221 and sent to the inspection apparatus 109 from the printing apparatus 107 through the communication cable 254. The image generation unit 405 determines based on this setting value whether the content of work is permitted as work to be performed by the operator.

If determining in S703 that the content of work is permitted as work to be performed by the operator, then in S704, the image generation unit 405 adds information indicating the content of work to a work list held in the memory 239. After S704 is S705, in which the image generation unit 405 refers to the first condition information corresponding to the part to be subjected to the content of work selected in S702 and holds the first condition information in the memory 239 in association with the information indicating the content of work selected in S702 in the work list. If determining in S703 that the content of work is not permitted as work to be performed by the operator, then in S706, the image generation unit 405 holds the information indicating the content of work selected in S702 in the memory 239 as a matter to be communicated to a service engineer.

After S705 or S706 is S707, in which the image generation unit 405 determines whether all contents of work have been selected in S702. If determining in S707 that there are one or more contents of work yet to be selected, the image generation unit 405 returns to S702 and selects one of the contents of work yet to be selected. The image generation unit 405 repeats the processes of S702 to S707 until determining in S707 that all contents of work have been selected. If determining in S707 that all contents of work have been selected, the image generation unit 405 determines in S708 whether there is information indicating one or more contents of work in the work list. If determining in S708 that there is information indicating one or more contents of work in the work list, then in S709, the image generation unit 405 generates an image representing the one or more contents of work included in the work list and the first condition information associated with the information indicating the one or more contents of work within the display region 513.

If determining in S708 that there is no information indicating a content of work in the work list, then in S710, the image generation unit 405 generates the image exemplarily illustrated in the display region 513 illustrated in FIG. 5B within the display region 513 in a case where there is no restoration completion information. In a case where there is restoration completion information, the image generation unit 405 refers to the restoration completion information and generates the image exemplarily illustrated in the display region 513 illustrated in FIG. 5C within the display region 513.

After S709 or S710 is S711, in which the image generation unit 405 determines whether the memory 239 holds a matter to be communicated to a service engineer. If determining in S711 that the memory 239 holds a matter to be communicated to a service engineer, then in S712, the image generation unit 405 generates an image representing the matter to be communicated to a service engineer, which has been held in S706, within the display region 513 illustrated in FIG. 5B, 5C, or 5D. After S712 or if determining in S711 that the memory 239 does not hold a matter to be communicated to a service engineer, the image generation unit 405 terminates the processing of the flowchart illustrated in FIG. 7. The present embodiment has been described such that the image representing the matter to be communicated to a service engineer is additionally generated, but only the image representing the one or more contents of work permitted as work to be performed by the operator may be generated. In this case, the processes of S706, S711, and S712 are not necessary.

With the inspection apparatus 109 configured as described above, management work such as maintenance of parts of the printing apparatus 107 can be performed in an integrated manner. Specifically, it is easy to determine whether an image forming problem has occurred due to the life of a part, whether an image forming problem has occurred due to the malfunction of a part, or the like, and it is also easy to determine the order of priority in performing tasks. As a result, the operator can prevent problems that may stop image forming in the printing apparatus 107.

Embodiment 2

Figure 8A:
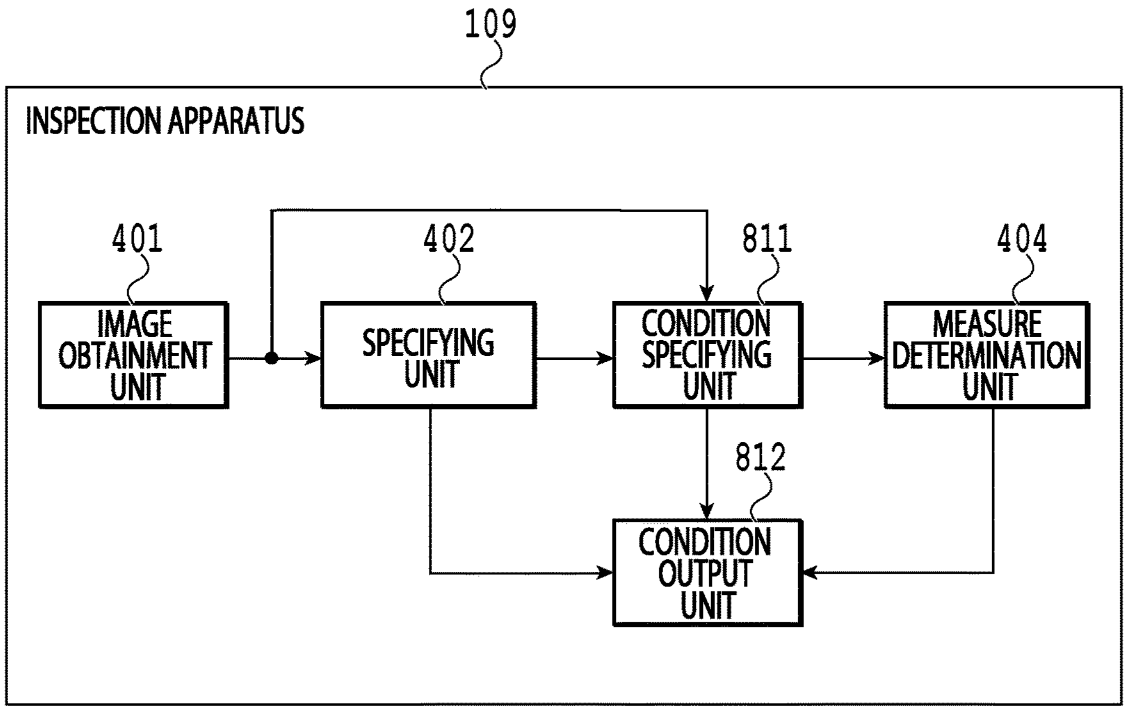
FIG. 8A is a block diagram illustrating an example of a functional configuration of an inspection apparatus.
Figure 8B:
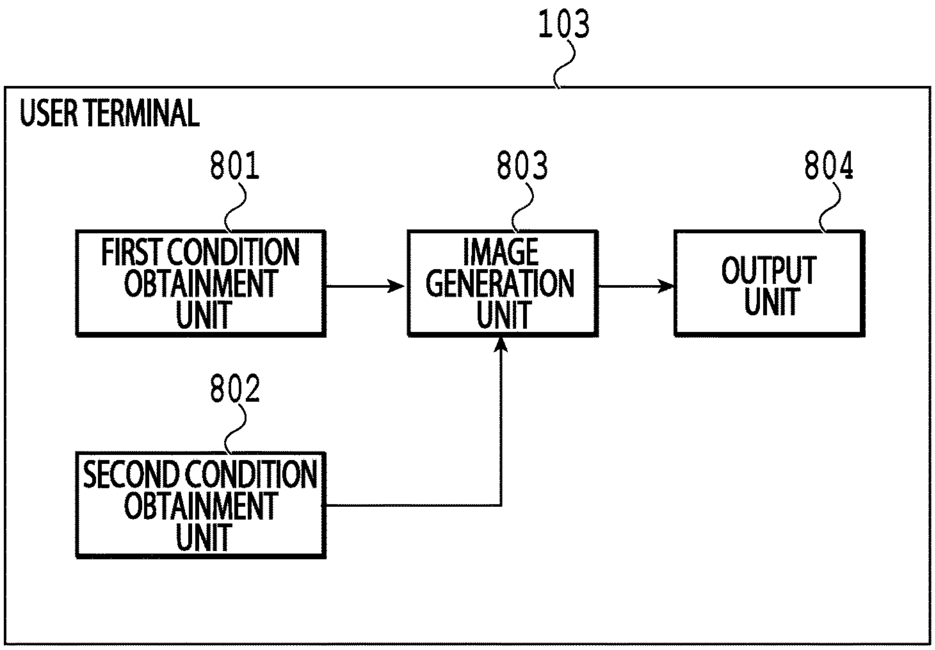
FIG. 8B is a block diagram illustrating an example of a functional configuration of a user terminal.

In Embodiment 1, a description has been given of a configuration in which the inspection apparatus 109 performs the image examination process and the process of displaying the image examination result. In Embodiment 2, a description will be given of a configuration in which the inspection apparatus 109 performs the image examination process and an apparatus other than the inspection apparatus 109, such as the user terminal 103, performs the process of displaying the image examination result. FIGS. 8A and 8B are block diagrams illustrating an example of functional configurations of an inspection apparatus 109 and a user terminal 103 according to Embodiment 2. Specifically, FIG. 8A is a block diagram illustrating an example of a functional configuration of the inspection apparatus 109 according to Embodiment 2 (hereinafter referred to simply as "inspection apparatus 109"). FIG. 8B is a block diagram illustrating an example of a functional configuration of the user terminal 103 according to Embodiment 2 (hereinafter referred to simply as "user terminal 103"). The inspection apparatus 109 includes, as its functional configuration, an image obtainment unit 401, an specifying unit 402, a condition specifying unit 811, a measure determination unit 404, and a condition output unit 812. Processes by the image obtainment unit 401, the specifying unit 402, the condition specifying unit 811, the measure determination unit 404, and the condition output unit 812 are performed by software using a CPU 238 and a memory 239. Of the components illustrated in FIG. 8A, similar components to components illustrated in FIG. 4 are denoted by the same reference signs, and detailed description thereof is omitted.

The image obtainment unit 401 obtains data of a scanned image. The specifying unit 402 specifies the state of a problem in the scanned image, if any, based on the data of the scanned image obtained by the image obtainment unit 401. The condition specifying unit 811 specifies the condition of the one or more parts causing the problem in the scanned image among the multiple constituent parts of a printing apparatus 107 based on the information indicating the state of the problem in the scanned image specified by the specifying unit 402. For example, the condition specifying unit 811 refers to a correspondence table prepared in advance and specifies the conditions of the one or more parts causing the problem in the scanned image that correspond to the form of the problem.

The measure determination unit 404 determines a measure to be taken against the cause of the problem in the scanned image. The condition output unit 812 outputs information indicating the conditions of the one or more parts causing the problem in the scanned image specified by the condition specifying unit 811 (second condition information). The condition output unit 812 also outputs part information and work information in addition to the second condition information. The second condition information, the part information, and the work information output by the condition output unit 812 are sent to the user terminal 103 through a communication cable 254, a first communication line 105, and a second communication line 104.

The user terminal 103 includes, as its functional configuration, a first condition obtainment unit 801, a second condition obtainment unit 802, an image generation unit 803, and an output unit 804. Processes by the first condition obtainment unit 801, the second condition obtainment unit 802, the image generation unit 803, and the output unit 804 are performed by software using a CPU 201 and a memory 202. The first condition obtainment unit 801 obtains information indicating the conditions of one or more constituent parts of the printing apparatus 107 specified based on the lives of the parts (first condition information). The function of the first condition obtainment unit 801 is similar to the function of the first condition obtainment unit 407 included in the inspection apparatus 109 according to Embodiment 1.

The second condition obtainment unit 802 obtains information indicating the conditions of one or more parts specified based on a scanned image obtained by reading a print medium on which an image has been formed by the printing apparatus 107 (hereinafter referred to as "second condition information"). Specifically, the second condition obtainment unit 802 obtains the second condition information output by the condition output unit 812 of the inspection apparatus 109. The condition output unit 802 also obtains part information and work information in addition to the second condition information. Specifically, the second condition obtainment unit 802 obtains the second condition information, the part information, and the work information by receiving them through the communication cable 254, the first communication line 105, and the second communication line 104.

Based on the first condition information obtained by the first condition obtainment unit 801 and the second condition information obtained by the second condition obtainment unit 802, the image generation unit 803 generates a display image representing the conditions of the one or more parts indicated by the first condition information and the conditions of the one or more parts indicated by the second condition information, or the like. Specifically, the image generation unit 803 generates a display image including an image region representing the conditions of the one or more parts indicated by the first condition information obtained by the first condition obtainment unit 801 and an image region representing the conditions of the one or more parts indicated by the second condition information obtained by the second condition obtainment unit 802. For example, the image generation unit 803 generates a display image in which the conditions of the one or more parts indicated by the first condition information and the conditions of the one or more parts indicated by the second condition information are identifiable from each other. The output unit 804 outputs a signal representing the display image generated by the image generation unit 803 to a display 205 to display the display image on the display 205. The display apparatus on which to display the display image is not limited to the display 205. The display image may be displayed on a display 212 of an external controller 102 or a display 225 of the printing apparatus 107, or the like.

Figure 9:
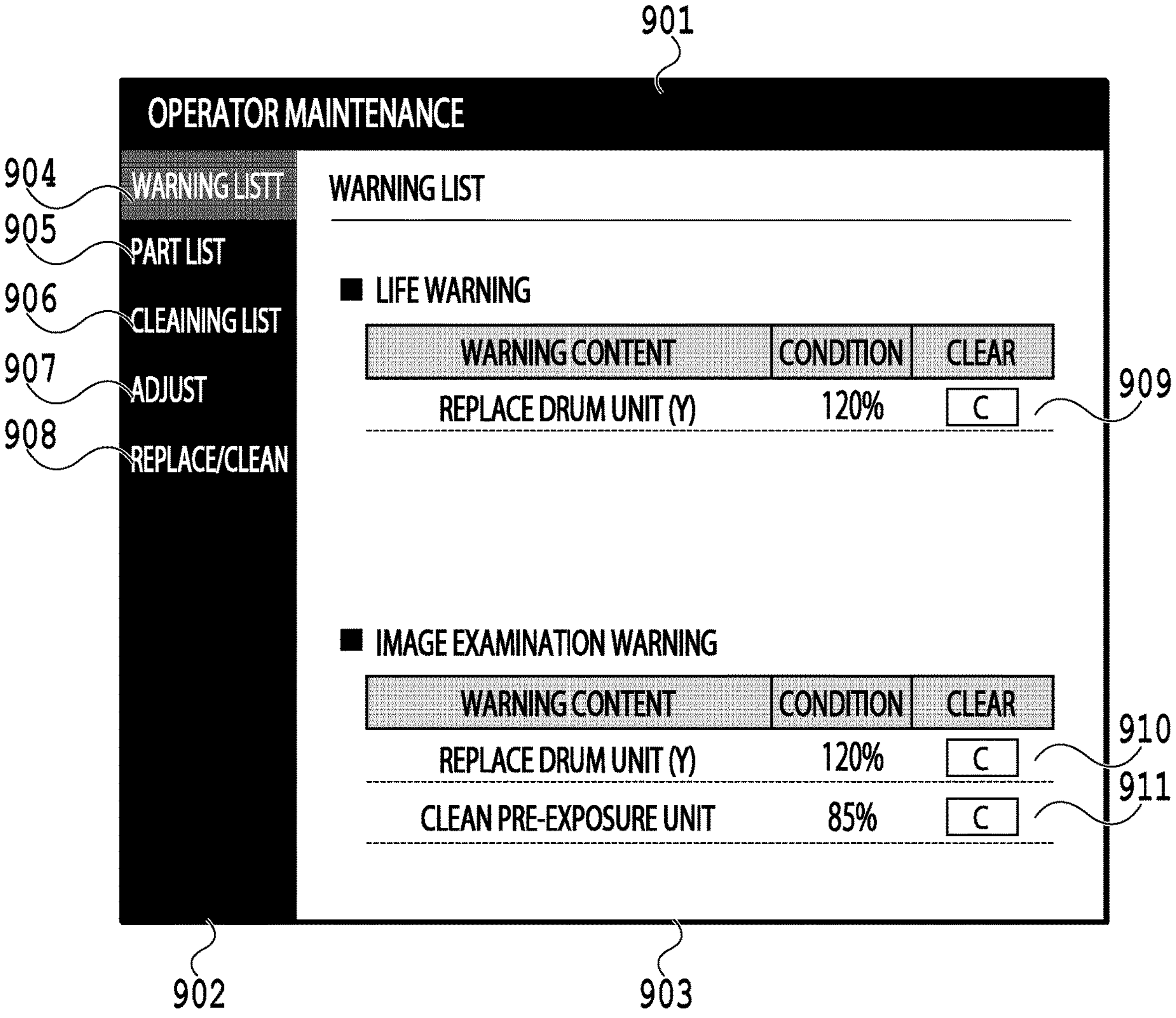
FIG. 9 is a diagram illustrating an example of a display image to be displayed on a display by the user terminal.

FIG. 9 is a diagram illustrating an example of the display image to be displayed on the display 205 by the user terminal 103 according to Embodiment 2. Specifically, FIG. 9 is an example of a display image corresponding to a maintenance tool's maintenance screen 901 in which the conditions of the one or more parts indicated by the first condition information and the conditions of the one or more parts indicated by the second condition information are presented in a identifiable manner. The maintenance screen 901 includes a screen switching menu 902. The screen switching menu 902 includes menu buttons 904 to 908. By selecting one of the menu buttons 904 to 908 with a keyboard 204, the operator can switch the display region of a display region 903 to a desired content. The menu button 904 is a button for displaying a warning list in the display region 903. In a case where the operator selects the menu button 904, a warning list listing warning information related to one or more parts is displayed in the display region 903.

The menu button 905 is a button for displaying a part list in the display region 903. In a case where the operator selects the menu button 905, a part list listing information indicating the conditions of all parts managed by the maintenance tool among the parts of the printing apparatus 107 is displayed in the display region 903. The menu button 906 is a button for displaying a cleaning list in the display region 903. In a case where the operator selects the menu button 906, a cleaning list listing information indicating the conditions of all parts requiring cleaning on an as-needed basis and managed by the maintenance tool among the parts of the printing apparatus 107 is displayed in the display region 903. The menu button 907 is a button for displaying an adjustment screen in the display region 903. In a case where the operator selects the menu button 907, a screen for making adjustments necessary after part replacement or cleaning is displayed in the display region 903. The menu button 908 is a button for displaying a screen indicating a procedure for part replacement or cleaning in the display region 903. In a case where the operator selects the menu button 908, the screen indicating a procedure for part replacement or cleaning is displayed in the display region 903.

Information on the parts managed by the maintenance tool and the types of work such as replacement and cleaning of the parts represents parts for which work is permitted to be performed by the operator or these types of work. This part or work information is registered in the printing apparatus 107 and stored in an HDD 221 of the printing apparatus 107, an HDD 203 of the user terminal 103, or the like by a service engineer. The display image illustrated in FIG. 9 exemplary represents a state where the menu button 904 is selected, displaying a warning list in the display region 903. The display region 903 exemplarily illustrated in FIG. 9 includes a display region displaying a life warning and a display region displaying an image examination warning. The display region displaying the life warning is a display region for displaying the conditions of the one or more parts indicated by the first condition information. The display region displaying the image examination warning is a display region for displaying the conditions of the one or more parts indicated by the second condition information. As described above, the image generation unit 803 generates a display image in which the conditions of the one or more parts indicated by the first condition information and the conditions of the one or more parts indicated by the second condition information are identifiable from each other.

The life warning lists, for example, the conditions of one or more parts whose current numbers of uses have reached the respective lifetime numbers of uses or numbers of uses until cleanings set as indications for work such as replacement or cleaning, or the contents of work for these parts as warning contents. The warning contents listed in the life warning are not limited to contents based on the numbers of uses of parts, and may be based on the periods of uses of the parts. In FIG. 9, a warning content indicating that the drum unit (Y) needs to be replaced is exemplarily listed due to the current number of uses or current period of use of the drum unit (Y) having reached its lifetime number of uses or lifetime period of use. In a case where the current number of uses or current period of use of a part has reached its number of uses until cleaning or period of use until cleaning, a warning content indicating that this part needs to be cleaned is listed. The image examination warning lists contents of work, as warning contents, such as replacement or cleaning, for one or more parts for which a problem has been specified by an image examination and which have been determined to require work such as replacement or cleaning by the measure determination unit 404 of the inspection apparatus 109. Specifically, in the image examination warning, the one or more parts requiring work such as replacement or cleaning which are indicated by the part information, and the contents of work for these parts which are indicated by the work information are listed in association with one another as warning contents.

The image examination warning in FIG. 9 exemplarily lists replacement of the drum unit (Y) and cleaning of the pre-exposure unit as warning contents. The life warning lists replacement of the drum unit (Y) as a warning content. These indicate that an image forming problem due to the drum unit (Y) has been detected in the image examination and that the number of uses or period of use for the drum unit (Y) has reached the life of the part as well. These also indicate that an image forming problem due to the pre-exposure unit has been detected in the image examination. Here, the condition of the pre-exposure unit is 85%, indicating that the current number of uses or period of use has only reached 85% of the number of uses or period of use until cleaning. For this reason, cleaning of the pre-exposure unit is not listed as a warning content in the life warning.

The maintenance screen 901 includes clear buttons 909 to 911. Each of the clear buttons 909 to 911 is a button for clearing the warning content addressed to the corresponding part, the condition of the part, and a counter of the number of uses or period of use of the part based on image forming. By pressing the one of the clear button 909 to 911 corresponding to a part after replacing or cleaning the part, the operator can clear the above-mentioned counter or the like.

In this way, the printing apparatus 107 is notified that the part has been replaced or cleaned.

As for the life warning, by pressing the clear button corresponding to the part after replacing or cleaning the part, the counter is cleared, and the degree of tear and wear, such as the current number of uses or period of use, is restored to the unused level. As a result, the information indicating the part and the work is deleted from the list. As for the image examination warning too, clearing, for example, one counter deletes the information indicating the corresponding part and work from the list. The method in which clearing a counter deletes the information indicating the corresponding part and work from the list is an example. The method is not limited to this one. For example, clearing the counter may not delete the information from the list in the image examination warning but the information may be deleted from the list in a case where a similar image examination is executed again and no similar problem is detected. Moreover, the information may be deleted from the list in the image examination warning even without the part replaced or cleaned, specifically, regardless of whether the counter is cleared or not, in a case where a similar image examination is executed again and no similar problem is detected.

By displaying the conditions of the one or more parts indicated by the first condition information and the conditions of the one or more parts indicated by the second condition information in a mutually identifiable manner, the operator can easily determine whether the image forming problem has occurred due to the wear and tear of one or more parts or due to the lives of one or more parts, or the like. This enables the operator to perform management work such as maintenance of parts of the printing apparatus 107 in an integrated manner. Such a display also makes it easier for the operator to determine the order of priority in performing tasks. As the content of work in the display region 513, only a content of work that can be performed by the operator may be displayed. As for work which can only be performed by a service engineer, the contact information of a service engineer who can perform the work or the like may be displayed. The display image illustrated in FIG. 9 is a mere example. The display image is not limited to this one as long as the operator can identify the warning based on the first condition information and the warning based on the second condition information from each other. For example, the warning based on the first condition information and the warning based on the second condition information may be displayed in the same list with respective images, such as icons, making the warnings identifiable from each other so that the operator can identify them from each other.

Figure 10:
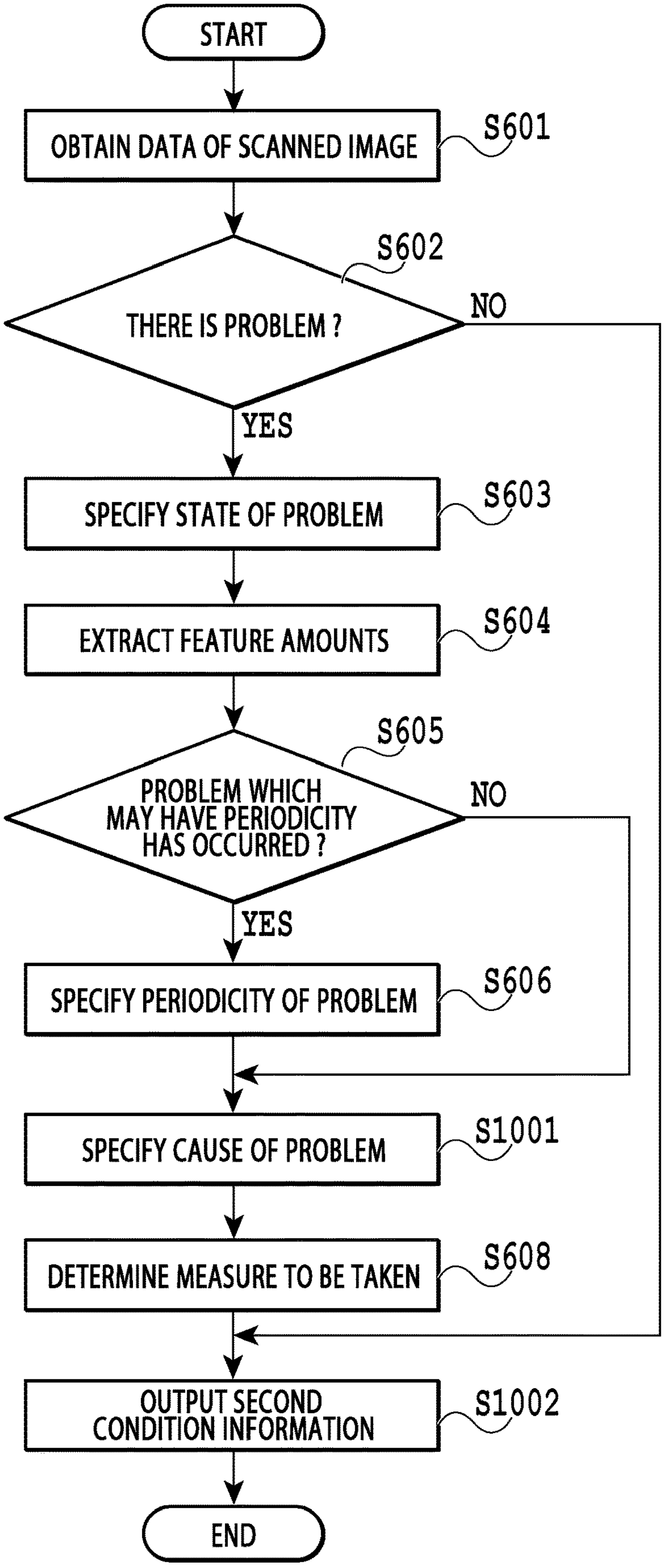
FIG. 10 is a flowchart illustrating an example of a process flow by the inspection apparatus.

FIG. 10 is a flowchart illustrating an example of a process flow by the inspection apparatus 109 according to Embodiment 2. The flowchart illustrated in FIG. 10 is executed, for example, in a case where the menu button 904 in the display image illustrated in FIG. 9 is selected. Of the steps illustrated in FIG. 10, steps similar to steps illustrated in FIG. 6 are denoted by the same reference signs, and detailed description thereof is omitted. First, the inspection apparatus 109 executes the processes of S601 to S606. The condition specifying unit 811 executes the processes of S604 to S606. After S606 is S1001, in which the condition specifying unit 811 specifies the conditions of the one or more parts causing the problem in the scanned image. After S1001, the inspection apparatus 109 executes the process of S608.

After S608 or if it is determined in S602 that there is no problem in the scanned image, the condition output unit 812 outputs the second condition information in S1002. If it is determined in S602 that there is a problem in the scanned image, the condition output unit 812 outputs part information and work information in addition to the second condition information in S1002. At this time, in a case where there is restoration completion information, the condition output unit 812 also outputs the restoration completion information in addition to the second condition information, the part information, and the work information. If it is determined in S602 that there is no problem in the scanned image, the condition output unit 812 outputs, for example, only the second condition information in S1002. After S1002, the inspection apparatus 109 terminates the processing of the flowchart illustrated in FIG. 10.

Figure 11:
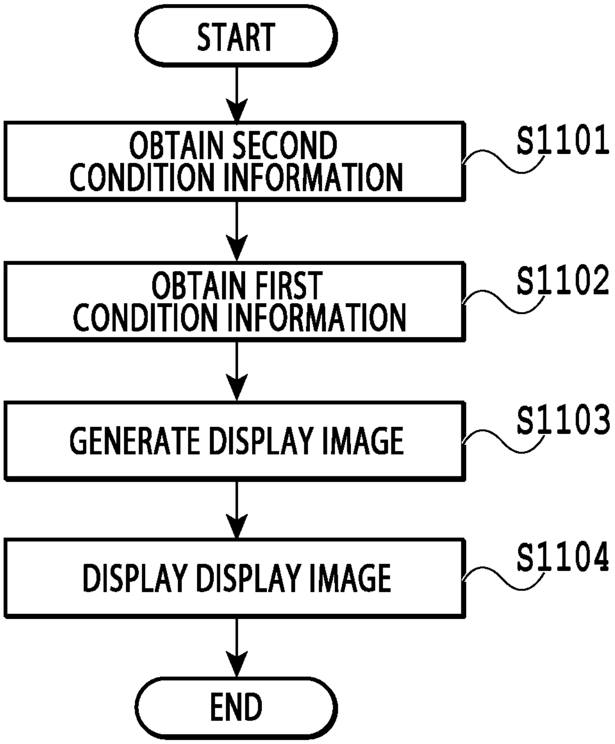
FIG. 11 is a flowchart illustrating an example of a process flow by a maintenance tool in the user terminal.

FIG. 11 is a flowchart illustrating an example of a process flow by the maintenance tool in the user terminal 103 according to Embodiment 2. The flowchart illustrated in FIG. 11 is executed, for example, in a case where the menu button 904 in the display image illustrated in FIG. 9 is selected. First, in S1101, the second condition obtainment unit 802 obtains the second condition information. In a case where part information, work information, and restoration completion information have been output from the inspection apparatus 109, the second condition obtainment unit 802 obtains the part information, the work information, and the restoration completion information in addition to the second condition information. Then, in S1102, the first condition obtainment unit 801 obtains the first condition information. Specifically, the first condition obtainment unit 801 obtains, for example, the first condition information of every part managed by the maintenance tool.

Then, in S1103, based on the second condition information obtained in S1101 and the first condition information obtained in S1102, the image generation unit 803 generates a display image representing the conditions of one or more parts indicated by the first condition information and the condition of one or more parts indicated by the second condition information. In the case where part information, work information, and restoration completion information have been obtained in S1101, the image generation unit 803 generates, for example, the display image exemplarily illustrated in FIG. 9 by using the part information, the work information, and the restoration completion information in addition to the first condition information and the second condition information. Then, in S1104, the output unit 804 outputs a signal representing the display image generated in S1103 to the display 205 to display the display image on the display 205. After S1104, the user terminal 103 terminates the processing of the flowchart illustrated in FIG. 11.

With the user terminal 103 configured as described above, management work such as maintenance of parts of the printing apparatus 107 can be performed in an integrated manner. Specifically, it is easy to determine whether an image forming problem has occurred due to the life of a part, whether an image forming problem has occurred due to the malfunction of a part, or the like, and it is also easy to determine the order of priority in performing tasks. As a result, the operator can prevent problems that may stop image forming in the printing apparatus 107.

In the present embodiment, the user terminal 103 has been described as an apparatus other than the external controller 102 and the printing apparatus 107, but the user terminal 103 is not limited to this form. For example, the external controller 102 or the printing apparatus 107 may include the user terminal 103, and the output unit 804 may output a signal representing a display image to the display 212 of the external controller 102 or the display 225 of the printing apparatus 107.

Embodiment 3

Figure 12A:
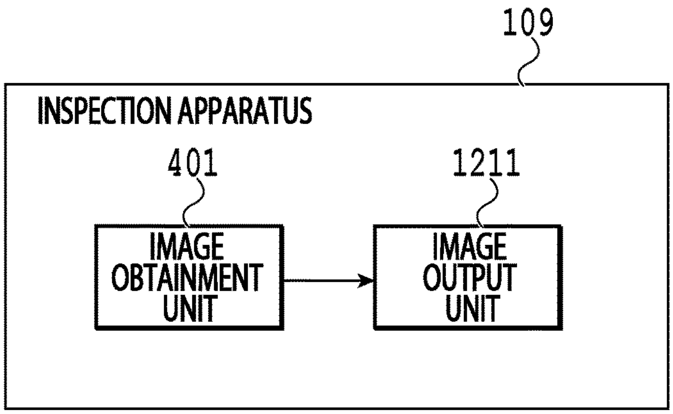
FIG. 12A is a block diagram illustrating an example of a functional configuration of an inspection apparatus.
Figure 12B:
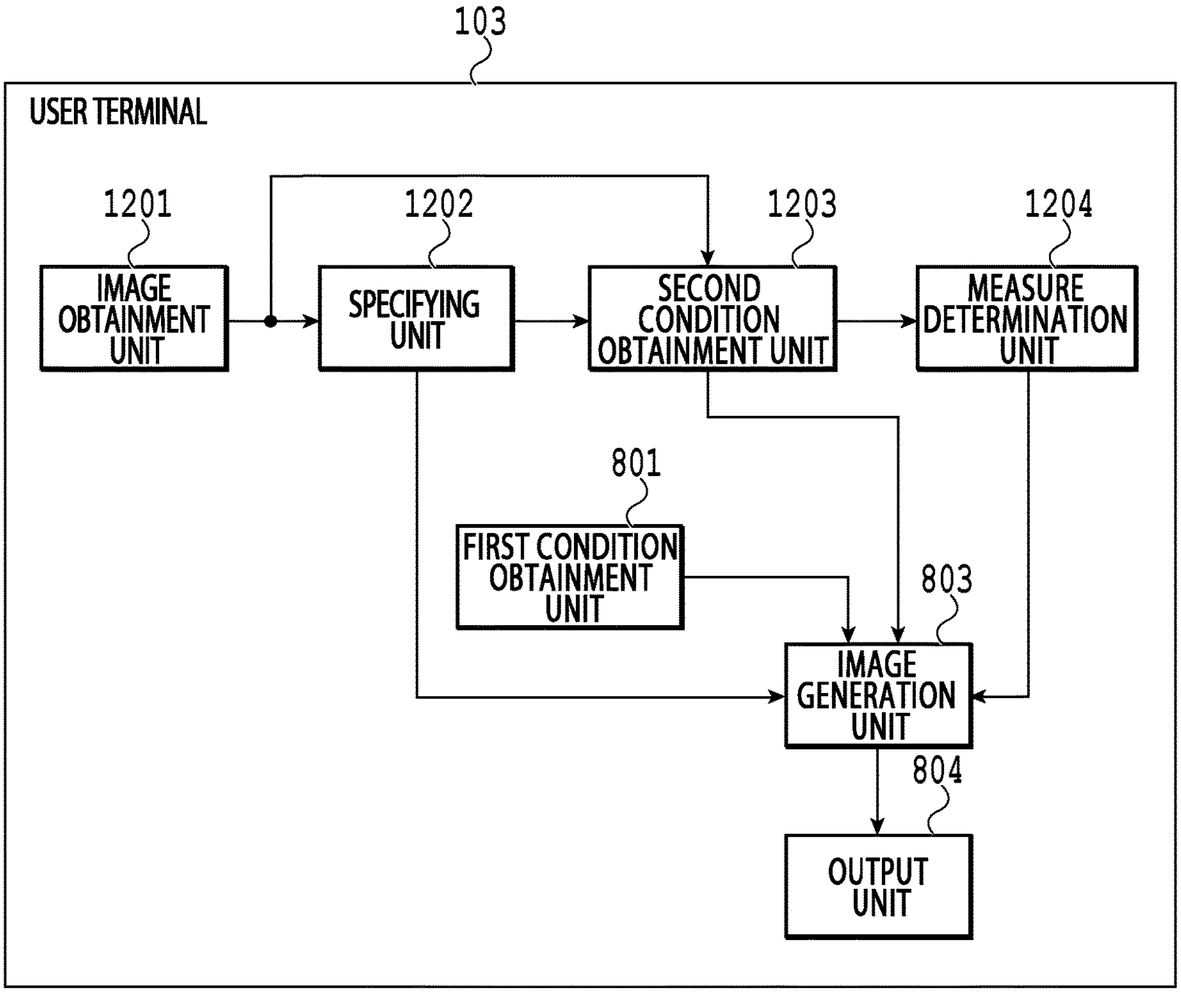
FIG. 12B is a block diagram illustrating an example of a functional configuration of a user terminal.

In Embodiment 1, a description has been given of a configuration in which the inspection apparatus 109 performs the image examination process and the process of displaying the image examination result. In Embodiment 2, a description has been given of a configuration in which the inspection apparatus 109 performs the image examination process and the user terminal 103 performs the process of displaying the image examination result. In Embodiment 3, a description will be given of a configuration in which the user terminal 103 performs the image examination process and the process of displaying the image examination result. FIGS. 12A and 12B are block diagrams illustrating an example of functional configurations of the inspection apparatus 109 and the user terminal 103 according to Embodiment 3. Specifically, FIG. 12A is a block diagram illustrating an example of a functional configuration of the inspection apparatus 109 according to Embodiment 3 (hereinafter referred to simply as "inspection apparatus 109"). FIG. 12B is a block diagram illustrating an example of a functional configuration of the user terminal 103 according to Embodiment 3 (hereinafter referred to simply as "user terminal 103").

The inspection apparatus 109 includes an image obtainment unit 401 and an image output unit 1211 as its functional configuration. Processes by the image obtainment unit 401 and the image output unit 1211 are performed by software using a CPU 238 and a memory 239. Of the components illustrated in FIG. 12A, similar components to components illustrated in FIG. 4 or 8A are denoted by the same reference signs, and detailed description thereof is omitted. The image obtainment unit 401 obtains data of a scanned image. The image output unit 1211 outputs data of a scanned image obtained by the image obtainment unit 401. The data of the scanned image output by the image output unit 1211 is sent to the user terminal 103 through a communication cable 254, a first communication line 105, and a second communication line 104.

The user terminal 103 includes, as its functional configuration, a first condition obtainment unit 801, an image obtainment unit 1201, an specifying unit 1202, a second condition obtainment unit 1203, a measure determination unit 1204, an image generation unit 803, and an output unit 804. Processes by the first condition obtainment unit 801, the image obtainment unit 1201, the specifying unit 1202, the second condition obtainment unit 1203, the measure determination unit 1204, the image generation unit 803, and the output unit 804 are performed by software using a CPU 201 and a memory 202. Of the components illustrated in FIG. 12B, similar components to components illustrated in FIG. 8B are denoted by the same reference signs, and detailed description thereof is omitted. The first condition obtainment unit 801 obtains the first condition information. The image obtainment unit 1201 obtains data of a scanned image output by the inspection apparatus 109. Specifically, the image obtainment unit 1201 obtains the data of the scanned image output by the image output unit 1211 through the communication cable 254, the first communication line 105, and the second communication line 104.

The specifying unit 1202 specifies the state of a problem in the scanned image, if any, based on the data of the scanned image obtained by the image obtainment unit 1201. The function of the specifying unit 1202 is similar to the function of the specifying unit 402 included in the inspection apparatus 109 according to Embodiment 1 or 2. As such, detailed description of the process of specifying the state of the problem in the scanned image by the specifying unit 1202 is omitted. The second condition obtainment unit 1203 obtains information indicating the conditions of one or more parts specified based on the scanned image (second condition information). The function of the second condition obtainment unit 1203 is similar to the function of the second condition obtainment unit 403 included in the inspection apparatus 109 according to Embodiment 1. As such, detailed description of the process of obtaining the second condition information by the second condition obtainment unit 1203 is omitted.

The measure determination unit 1204 determines a measure to be taken against the cause of the problem in the scanned image to remedy the problem. The function of the measure determination unit 1204 is similar to the function of the measure determination unit 404 included in the inspection apparatus 109 according to Embodiment 1 or 2. As such, detailed description of the process of determining the measure to be taken against the cause of the problem in the scanned image by the measure determination unit 1204 is omitted. Based on the first condition information obtained by the first condition obtainment unit 801 and the second condition information obtained by the second condition obtainment unit 1203, the image generation unit 803 generates a display image representing the conditions of the one or more parts indicated by the first condition information and the conditions of the one or more parts indicated by the second condition information, or the like. Specifically, the image generation unit 803 generates, for example, the display image exemplarily illustrated in FIG. 9. The output unit 804 outputs a signal representing the display image generated by the image generation unit 803 to a display 205 to display the display image on the display 205.

Figure 13:
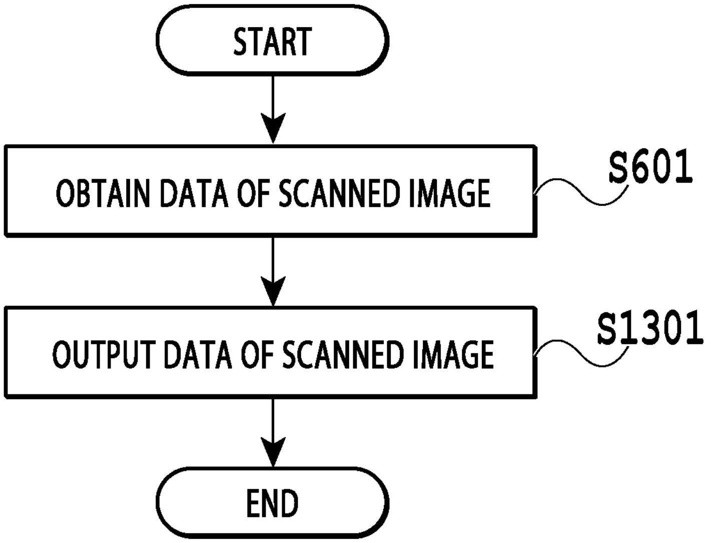
FIG. 13 is a flowchart illustrating an example of a process flow by the inspection apparatus.

FIG. 13 is a flowchart illustrating an example of a process flow by the inspection apparatus 109 according to Embodiment 3. The flowchart illustrated in FIG. 13 is executed, for example, in a case where the menu button 904 in the display image illustrated in FIG. 9 is selected. Of the steps illustrated in FIG. 13, a step similar to a step illustrated in FIG. 6 or 10 is denoted by the same reference sign, and detailed description thereof is omitted. First, the inspection apparatus 109 executes the process of S601. After S601 is S1301, in which the image output unit 1211 outputs the data of the scanned image obtained in S601. After S1301, the inspection apparatus 109 terminates the processing of the flowchart illustrated in FIG. 13.

Figure 14:
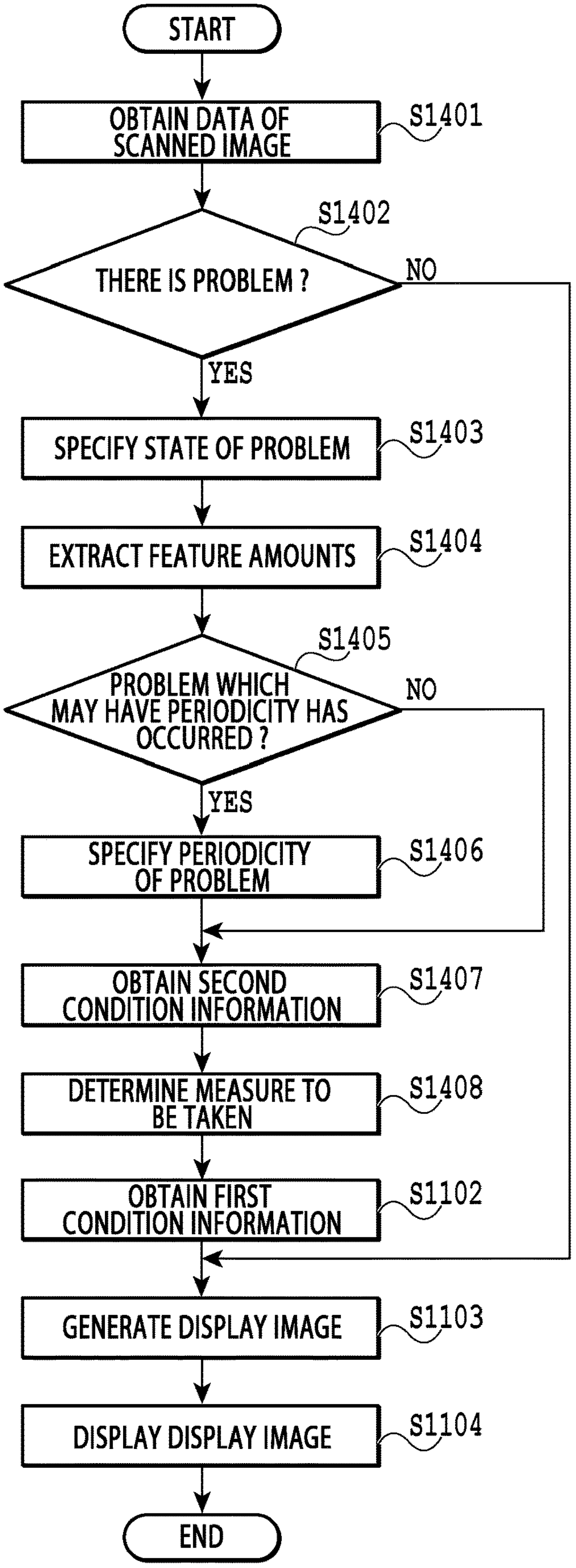
FIG. 14 is a flowchart illustrating an example of a process flow by a maintenance tool in the user terminal.

FIG. 14 is a flowchart illustrating an example of a process flow by a maintenance tool in the user terminal 103 according to Embodiment 3. The flowchart illustrated in FIG. 14 is executed, for example, in a case where the menu button 904 in the display image illustrated in FIG. 9 is selected. Of the steps illustrated in FIG. 14, steps similar to steps illustrated in FIG. 11 are denoted by the same reference signs, and detailed description thereof is omitted. First, in S1401, the image obtainment unit 1201 obtains data of a scanned image. Specifically, the image obtainment unit 1201 data of a scanned image output by the inspection apparatus 109 through the communication cable 254, the first communication line 105, and the second communication line 104.

After S1401 is S1402, in which the specifying unit 1202 determines whether there is a problem in the scanned image obtained in S1401. If determining in S1402 that there is a problem in the scanned image obtained in S1401, then in S1403, the specifying unit 1202 specifies the state of the problem in the scanned image obtained in S1401. Specifically, the specifying unit 1202 specifies the form of the problem, such as whether it is a positional shift of the scanned image, a vertical or horizontal streak in the scanned image, or soiling of the scanned image. The form of the problem in the scanned image is specified by determining, for each of the features of the above-listed problem forms, whether the feature is present in the scanned image, for example.

The specifying method is not limited to the above method. For example, the specifying unit 1202 may compare a reference image of a test chart stored in an HDD 203 of the user terminal 103 or the like and the scanned image obtained in S1401, and specify the form of the problem in the scanned image based on the difference between the two images. In a case where there are multiple scanned images with a problem, the forms of the problems in the scanned images may be specified individually or collectively. For example, the specifying unit 1202 specifies the form of the problem in each scanned image by specifying the presence or absence of a problem in the scanned image based on each problem form.

After S1403 is S1404, in which the second condition obtainment unit 1203 extracts feature amounts corresponding to the form of the problem in the scanned image specified in S1403 from the scanned image. In a case where the form of the problem in the scanned image is, for example, a streaky defect, the feature amounts to be extracted are information indicating the number of streaks, the positions of the streaks, the widths of the streaks, the periodic intervals of the streaks, and so on. The second condition obtainment unit 1203 stores the extracted feature amounts in the HDD 203 or the like.

After S1404 is S1405, in which the second condition obtainment unit 1203 determines whether a problem which may have periodicity has occurred based on the form of the problem in the scanned image specified in S1403 and the feature amounts extracted in S1404. If determining in S1405 that a problem which may have periodicity has occurred, then in S1406, the second condition obtainment unit 1203 specifies the periodicity of the problem based on the form of the problem in the scanned image specified in S1403 and the feature amounts extracted in S1404. For example, in a case where the form of the problem in the scanned image is a streaky defect, the second condition obtainment unit 1203 specifies the intervals of the positions at which the streaks are generated as the periodic intervals of the streaks based on the positions and number of generated streaks extracted as the feature amounts. The second condition obtainment unit 1203 stores the specified information on the periodic intervals of the streaks in the HDD 203 or the like.

After S1406 or if determining in S1405 that a problem which may have periodicity has not occurred, the second condition obtainment unit 1203 obtains the second condition information in S1407. Specifically, in S1407, the second condition obtainment unit 1203 firstly specifies the conditions of the one or more parts causing the problem in the scanned image. For example, after S1406, the second condition obtainment unit 1203 specifies the conditions of the one or more parts causing the problem in the scanned image based on the form of the problem in the scanned image specified in S1403, the feature amounts extracted in S1404, and the periodicity specified in S1406. Also, if determining in S1405 that a problem which may have periodicity has not occurred, the second condition obtainment unit 1203 specifies the conditions of the one or more parts causing the problem in the scanned image based on the specified form of the problem in the scanned image and the extracted feature amounts.

For example, the second condition obtainment unit 1203 specifies the conditions of the one or more parts causing the problem in the scanned image by referring to a correspondence table in which, for each problem form, feature amounts to be extracted and the condition of one or more parts causing the problem are associated with each other in advance. In S1407, the second condition obtainment unit 1203 subsequently obtains information indicating the specified conditions of the one or more parts causing the problem in the scanned image as the second condition information, and stores the obtained second condition information in the HDD 203 or the like.

After S1407 is S1408, in which the measure determination unit 1204 determines a measure to be taken against the cause of the problem specified in S1407 based on this cause. In a case where the determined measure to be taken includes automatic restoration, the measure determination unit 1204 may determine the content of the automatic restoration, and the user terminal 103 may instruct a printing apparatus 107 to implement the content. In this case, the printing apparatus 107 performs the automatic restoration with the above content, and the user terminal 103 receives a notification indicating the completion of the automatic restoration from a CPU 222 of the printing apparatus 107 and stores restoration completion information indicating the completion of the automatic restoration in the HDD 203 or the like. In a case where the determined measure to be taken includes work such as part replacement or cleaning, the measure determination unit 1204 stores part information indicating the one or more parts that need the work, such as replacement or cleaning, and work information indicating the content of the work for each part in the HDD 203 or the like.

The measure determination unit 1204 may send the part information and the work information to the printing apparatus 107 to store the part information and the work information in an HDD 221 of the printing apparatus 107 or the like in addition to the HDD 203 or the like. By storing the part information and the work information in the HDD 221 of the printing apparatus 107, it is possible to track whether the part replacement or cleaning work has been done or not on the printing apparatus 107. Moreover, by storing the part information and the work information in the HDD 221 of the printing apparatus 107, information indicating the specified cause and the like can be held until a service engineer performs the work. After S1408 or if it is determined in S1402 that there is no problem in the scanned image, the user terminal 103 executes the process of S1102. After S1102, the user terminal 103 executes the processes of S1103 and S1104. After S1104, the user terminal 103 terminates the processing of the flowchart illustrated in FIG. 14.

With the user terminal 103 configured as described above, management work such as maintenance of parts of the printing apparatus 107 can be performed in an integrated manner. Specifically, it is easy to determine whether an image forming problem has occurred due to the life of a part, whether an image forming problem has occurred due to the malfunction of a part, or the like, and it is also easy to determine the order of priority in performing tasks. As a result, the operator can prevent problems that may stop image forming in the printing apparatus 107.

In the present embodiment, the user terminal 103 has been described as an apparatus other than an external controller 102 and the printing apparatus 107, but the user terminal 103 is not limited to this form. For example, the external controller 102 or the printing apparatus 107 may include the user terminal 103, and the output unit 804 may output a signal representing a display image to a display 212 of the external controller 102 or a display 225 of the printing apparatus 107.

Other Embodiments

In the above embodiments, descriptions have been given of configurations which generate a display image representing one or more contents of work for reducing the cause of a problem in a scanned image caused by one or more constituent parts of the printing apparatus 107 in addition to the conditions of the one or more parts. However, the one or more contents of work for reducing the cause do not necessarily have to be displayed in the display image. For example, a display image indicating only the condition of a part, such as "Abnormality detected on the drum unit (K)" or "Dirt attached to the pre-exposure unit", may be generated. By checking such a display image, the operator can determine whether it is necessary to perform work such as replacement of the drum unit (K) or cleaning of the pre-exposure unit.

In the above embodiments, descriptions have been given of configurations which obtain only the first condition information of one or more parts causing a problem in a scanned image. However, the first condition information to be obtained is not limited to this one. For example, the first condition information of some or all of the constituent parts of the printing apparatus 107 including the one or more parts causing the problem in the scanned image may be obtained. In this case, the life warning in the display image exemplarily illustrated in FIG. 9 lists the conditions of the parts whose numbers of use or periods of use have reached their lives among the one or more parts indicated by the obtained first condition information. Such a configuration enables the operator to recognize when the parts other than the part causing the problem in the scanned image require work such as replacement or cleaning.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to perform management work such as maintenance of parts of a printing apparatus in an integrated manner.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-166417, filed Oct. 17, 2022 which is hereby incorporated by reference wherein in its entirety.

What is claimed is:

1. An apparatus comprising:

one or more hardware processors; and one or more memories storing one or more programs configured to be executed by the one or more hardware processors, the one or more programs including instructions for:

obtaining first condition information indicating a condition of a constituent part of a printing apparatus, specified based on a life of the part;

obtaining second condition information indicating a condition of the part specified based on a scanned image obtained by reading a print medium on which an image has been formed by the printing apparatus;

generating a display image representing the condition of the part indicated by the first condition information and the condition of the part indicated by the second condition information; and outputting a signal representing the display image, wherein the display image is generated in which a first image region representing the condition of the part indicated by the first condition information and a second image region representing the condition of the part indicated by the second condition information are disposed in an identifiable manner, wherein the first image region and the second image region are displayed on a same display page, wherein the first condition information includes a first numerical value related to the first condition and the second condition information includes a second numerical value related to the second condition, wherein the first condition information is information based on information indicating a lifetime number of uses of the part and information indicating a number of uses of the part after replacement of the part, or information based on information indicating a lifetime period of use of the part and information indicating a period of use of the part after replacement of the part, and wherein the one or more programs further include instructions for:

obtaining data of the scanned image; and specifying a state of a problem in the scanned image, wherein the second condition information is obtained by specifying a condition of the part causing the problem in the scanned image based on the specified state of the problem in the scanned image, wherein the display image is generated which indicates the condition only of parts permitted to be replaced or cleaned by an operator among the conditions of one or more of the parts indicated by the first condition information, and the condition only of parts permitted to be replaced or cleaned by the operator among the conditions of one or more of the parts indicated by the second condition information, wherein the second condition information includes a quantified index that is calculated by comparing the scanned image with a pre-stored reference image, and the quantified index is numerically displayed in the second image region together with the second numerical value.

2. The apparatus according to claim 1, wherein the first condition information includes at least one of information indicating a indication for replacement of the part and information indicating a indication for cleaning of the part as information indicating a condition of the part.

3. The apparatus according to claim 1, wherein the first condition information is information based on information indicating a number of uses of the part until the part needs cleaning and information indicating a number of uses of the part after cleaning of the part, or information based on information indicating a period of use of the part until the part needs cleaning and information indicating a period of use of the part after cleaning of the part.

4. The apparatus according to claim 1, wherein the second condition information includes at least one of information indicating a indication for replacement of the part and information indicating a indication for cleaning of the part as information indicating a condition of the part.

5. The apparatus according to claim 1, wherein the one or more programs further include an instruction for determining a measure to be taken to remedy the cause, wherein the display image is generated which indicates a content of the measure to be taken in addition to the condition of the part indicated by the first condition information and the condition of the part indicated by the second condition information.

6. The apparatus according to claim 1, further comprising a reading device that reads the image formed on the print medium, wherein data of the image obtained by the reading by the reading device is obtained as the data of the scanned image.

7. The apparatus according to claim 1, wherein the apparatus is an information processing apparatus that outputs print data for causing the printing apparatus to perform image forming.

8. The apparatus according to claim 1, further comprising a display device that displays the display image, wherein the signal representing the display image is output to the display device to display the display image on the display device.

9. The apparatus according to claim 1, wherein the printing apparatus from which the first condition information is obtained includes a display device that displays the display image, and the signal representing the display image is output to the display device to display the display image on the display device.

10. The apparatus according to claim 1, wherein the display image comprises:

(a) a first graphical indicator that visualizes the first numerical value, and (b) a second graphical indicator that visualizes the second numerical value, the first graphical indicator and the second graphical indicator being disposed side-by-side on the same display page and being distinguishable from each other by color, hue or pattern.

11. The apparatus according to claim 1, further comprising an authorization storage that stores, for each constituent part, permission information indicating whether replacement or cleaning by an operator is allowed, wherein the display image is generated after automatically filtering, on the basis of the permission information, the constituent parts whose conditions are to be displayed.

12. A method of processing information related to a condition of a constituent part of a printing apparatus, the method being performed by an apparatus including one or more hardware processors and one or more memories storing one or more programs configured to be executed by the one or more hardware processors, the one or more programs including instructions for performing the method, the method comprising the steps of:

controlling forming of an image on a print medium;

controlling reading of the image formed on the print medium;

obtaining, by the apparatus, first condition information indicating a condition of a constituent part of a printing apparatus, specified based on a life of the part;

obtaining, by the apparatus, second condition information indicating a condition of the part specified based on a scanned image obtained by reading a print medium on which an image has been formed by the printing apparatus;

generating, by the apparatus, a display image representing the condition of the part indicated by the first condition information and the condition of the part indicated by the second condition information; and outputting, by the apparatus, a signal representing the display image, wherein the display image is generated in which a first image region representing the condition of the part indicated by the first condition information and a second image region representing the condition of the part indicated by the second condition information are disposed in an identifiable manner, wherein the first image region and the second image region are displayed on a same display page, wherein the first condition information includes a first numerical value related to the first condition and the second condition information includes a second numerical value related to the second condition, wherein the first condition information is information based on information indicating a lifetime number of uses of the part and information indicating a number of uses of the part after replacement of the part, or information based on information indicating a lifetime period of use of the part and information indicating a period of use of the part after replacement of the part, and wherein the one or more programs further include instructions for:

obtaining data of the scanned image; and specifying a state of a problem in the scanned image, wherein the second condition information is obtained by specifying a condition of the part causing the problem in the scanned image based on the specified state of the problem in the scanned image, wherein the display image is generated which indicates the condition only of parts permitted to be replaced or cleaned by an operator among the conditions of one or more of the parts indicated by the first condition information, and the condition only of parts permitted to be replaced or cleaned by the operator among the conditions of one or more of the parts indicated by the second condition information, wherein the second condition information includes a quantified index that is calculated by comparing the scanned image with a pre-stored reference image, and the quantified index is numerically displayed in the second image region together with the second numerical value.

13. A non-transitory computer readable storage medium storing a program for causing a computer to perform a control method of an apparatus, the control method comprising the steps of:

controlling forming of an image on a print medium;

controlling reading of the image formed on the print medium;

obtaining first condition information indicating a condition of a constituent part of a printing apparatus, specified based on a life of the part;

obtaining second condition information indicating a condition of the part specified based on a scanned image obtained by reading a print medium on which an image has been formed by the printing apparatus;

generating a display image representing the condition of the part indicated by the first condition information and the condition of the part indicated by the second condition information; and outputting a signal representing the display image, wherein the display image is generated in which a first image region representing the condition of the part indicated by the first condition information and a second image region representing the condition of the part indicated by the second condition information are disposed in an identifiable manner, wherein the first image region and the second image region are displayed on a same display page, wherein the first condition information includes a first numerical value related to the first condition and the second condition information includes a second numerical value related to the second condition, wherein the first condition information is information based on information indicating a lifetime number of uses of the part and information indicating a number of uses of the part after replacement of the part, or information based on information indicating a lifetime period of use of the part and information indicating a period of use of the part after replacement of the part, and wherein the method further comprises the steps of:

obtaining data of the scanned image; and specifying a state of a problem in the scanned image, wherein the second condition information is obtained by specifying a condition of the part causing the problem in the scanned image based on the specified state of the problem in the scanned image, wherein the display image is generated which indicates the condition only of parts permitted to be replaced or cleaned by an operator among the conditions of one or more of the parts indicated by the first condition information, and the condition only of parts permitted to be replaced or cleaned by the operator among the conditions of one or more of the parts indicated by the second condition information, wherein the second condition information includes a quantified index that is calculated by comparing the scanned image with a pre-stored reference image, and the quantified index is numerically displayed in the second image region together with the second numerical value.

14. A system comprising:

one or more hardware processors; and one or more memories storing one or more programs configured to be executed by the one or more hardware processors, the one or more programs including instructions for:

controlling forming of an image on a print medium;

specifying a condition of a part to be used in the forming of the image based on a life of the part to thereby obtain first condition information indicating a condition of the part which is based on the life of the part;

controlling reading of the image formed on the print medium;

obtaining data of a scanned image obtained by reading the image formed on the print medium;

specifying a state of a problem in the scanned image;

specifying a condition of the part based on the state of the problem in the scanned image to thereby specify a condition of the part which is based on the scanned image;

obtaining second condition information indicating the specified condition of the part;

generating a display image representing the condition of the part indicated by the first condition information and the condition of the part indicated by the second condition information; and outputting a signal representing the display image, wherein the display image is generated in which a first image region representing the condition of the part indicated by the first condition information and a second image region representing the condition of the part indicated by the second condition information are disposed in an identifiable manner, wherein the first image region and the second image region are displayed on a same display page, and wherein the first condition information includes a first numerical value related to the first condition and the second condition information includes a second numerical value related to the second condition, wherein the first condition information is information based on information indicating a lifetime number of uses of the part and information indicating a number of uses of the part after replacement of the part, or information based on information indicating a lifetime period of use of the part and information indicating a period of use of the part after replacement of the part, and wherein the method further comprises the steps of:

obtaining data of the scanned image; and specifying a state of a problem in the scanned image, wherein the second condition information is obtained by specifying a condition of the part causing the problem in the scanned image based on the specified state of the problem in the scanned image, wherein the display image is generated which indicates the condition only of parts permitted to be replaced or cleaned by an operator among the conditions of one or more of the parts indicated by the first condition information, and the condition only of parts permitted to be replaced or cleaned by the operator among the conditions of one or more of the parts indicated by the second condition information, wherein the second condition information includes a quantified index that is calculated by comparing the scanned image with a pre-stored reference image, and the quantified index is numerically displayed in the second image region together with the second numerical value.

15. The system according to claim 14, wherein the system comprises a printing apparatus, an inspection apparatus, and an information processing apparatus, the printing apparatus comprising:

one or more first hardware processors of the one or more hardware processors; and one or more first memories, of the one or more memories, storing one or more programs configured to be executed by the one or more first hardware processors, the one or more programs including an instruction for controlling the forming of the image on the print medium, and the inspection apparatus comprising:

one or more second hardware processors of the one or more hardware processors; and one or more second memories, of the one or more memories, storing one or more programs configured to be executed by the one or more second hardware processors, the one or more programs including instructions for:

specifying the condition of the part to be used in the forming of the image based on the life of the part to thereby obtain the first condition information indicating the condition of the part which is based on the life of the part;

controlling reading of the image formed on the print medium;

obtaining the data of the scanned image obtained by reading the image formed on the print medium;

specifying the state of the problem in the scanned image;

specifying the condition of the part based on the state of the problem in the scanned image to thereby specify the condition of the part which is based on the scanned image;

obtaining the second condition information indicating the specified condition of the part;

generating the display image representing the condition of the part indicated by the first condition information and the condition of the part indicated by the second condition information; and outputting the signal representing the display image.

16. The system according to claim 14, wherein the system comprises a printing apparatus, an inspection apparatus, and an information processing apparatus, the printing apparatus comprising:

one or more first hardware processors of the one or more hardware processors; and one or more first memories, of the one or more memories, storing one or more programs configured to be executed by the one or more first hardware processors, the one or more programs including an instruction for controlling the forming of the image on the print medium, the inspection apparatus comprising:

one or more second hardware processors of the one or more hardware processors; and one or more second memories, of the one or more memories, storing one or more programs configured to be executed by the one or more second hardware processors, the one or more programs including instructions for:

controlling reading of the image formed on the print medium;

obtaining the data of the scanned image obtained by reading the image formed on the print medium;

specifying the state of the problem in the scanned image;

specifying the condition of the part based on the state of the problem in the scanned image to thereby specify the condition of the part which is based on the scanned image; and outputting the second condition information indicating the specified condition of the part, and the information processing apparatus comprising:

one or more third hardware processors of the one or more hardware processors; and one or more third memories, of the one or more memories, storing one or more programs configured to be executed by the one or more third hardware processors, the one or more programs including instructions for:

specifying the condition of the part to be used in the forming of the image based on the life of the part to thereby obtain the first condition information indicating the condition of the part which is based on the life of the part;

obtaining the second condition information indicating the condition of the part;

generating the display image representing the condition of the part indicated by the first condition information and the condition of the part indicated by the second condition information; and outputting the signal representing the display image, and wherein the information processing apparatus obtains the second condition information output by the inspection apparatus.

17. The system according to claim 14, wherein the system comprises a printing apparatus, a reading apparatus, and an information processing apparatus, the printing apparatus comprising:

one or more first hardware processors of the one or more hardware processors; and one or more first memories, of the one or more memories, storing one or more programs configured to be executed by the one or more first hardware processors, the one or more programs including an instruction for controlling the forming of the image on the print medium, the reading apparatus comprising:

one or more second hardware processors of the one or more hardware processors; and one or more second memories, of the one or more memories, storing one or more programs configured to be executed by the one or more second hardware processors, the one or more programs including instructions for:

controlling reading of the image formed on the print medium; and outputting, to the information processing apparatus, data of the image, and the information processing apparatus comprising:

one or more third hardware processors of the one or more hardware processors; and one or more third memories, of the one or more memories, storing one or more programs configured to be executed by the one or more third hardware processors, the one or more programs including instructions for:

specifying the condition of the part to be used in the forming of the image based on the life of the part to thereby obtain the first condition information indicating the condition of the part which is based on the life of the part;

obtaining the data of the scanned image obtained by reading the image formed on the print medium;

specifying the state of the problem in the scanned image;

specifying the condition of the part based on the state of the problem in the scanned image to thereby specify the condition of the part which is based on the scanned image;

obtaining, from the reading apparatus, the second condition information indicating the condition of the part;

generating the display image representing the condition of the part indicated by the first condition information and the condition of the part indicated by the second condition information; and outputting the signal representing the display image, and wherein the information processing apparatus obtains the data of the image output by the reading apparatus as the data of the scanned image.

* * * * *